United States Patent
Iwanaga

(10) Patent No.: US 7,010,291 B2
(45) Date of Patent: Mar. 7, 2006

(54) MOBILE TELEPHONE UNIT USING SINGING VOICE SYNTHESIS AND MOBILE TELEPHONE SYSTEM

(75) Inventor: Tomohiro Iwanaga, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 472 days.

(21) Appl. No.: 10/115,991

(22) Filed: Apr. 5, 2002

(65) Prior Publication Data

US 2003/0104785 A1 Jun. 5, 2003

(30) Foreign Application Priority Data

Dec. 3, 2001 (JP) ............... 2001-368206

(51) Int. Cl.
H04M 3/42 (2006.01)
H04M 1/00 (2006.01)
H04B 7/00 (2006.01)
H04B 1/38 (2006.01)

(52) U.S. Cl. ............ 455/414.1; 455/66.1; 455/567; 455/556.1

(58) Field of Classification Search .......... 455/66.1, 455/422.1, 418, 419, 466, 566, 567, 556.1; 704/258, 268; 84/600, 604, 631, 645, 609; 434/307 A See application file for complete search history.

(56) References Cited

U.S. PATENT DOCUMENTS

| 5,521,326 | A | * | 5/1996 | Sone ............... 84/631 |
| 5,689,081 | A | * | 11/1997 | Tsurumi ............. 84/609 |
| 5,857,171 | A | * | 1/1999 | Kageyama et al. ......... 704/268 |
| 5,890,910 | A | * | 4/1999 | Tsurumi et al. ......... 434/307 A |
| 5,980,261 | A | * | 11/1999 | Mino et al. ............. 434/307 A |
| 6,083,009 | A | * | 7/2000 | Kim et al. ............. 434/307 A |
| 6,725,064 | B1 | * | 4/2004 | Wakamatsu et al. ......... 455/566 |
| 2004/0116088 | A1 | * | 6/2004 | Ellis et al. .............. 455/132 |

FOREIGN PATENT DOCUMENTS

JP 2001-060990 3/2001

* cited by examiner

Primary Examiner—Nick Corsaro
Assistant Examiner—Raymond B. Persino
(74) Attorney, Agent, or Firm—Rabin & Berdo, P.C.

(57) ABSTRACT

A mobile telephone unit of the invention comprises a storage section for storing karaoke piece data, a controller for reading the karaoke piece data from the storage section, analyzing the karaoke piece data, and fetching melody information and singing voice synthesis information based on the karaoke piece data, a sound generator for analyzing the melody information received from the controller and producing multiple melody signals, a singing voice synthesizing section for analyzing the singing voice synthesis information received from the controller and producing multiple synthetic singing voice signals, and an audio reproducing section for receiving the multiple melody signals outputted from the sound generator and the multiple synthetic singing voice signals outputted from the singing voice synthesizing section in synchronization with timings when the multiple melody signals are outputted, thereby sounding a karaoke piece.

8 Claims, 19 Drawing Sheets

FLOWCHART EXPLAINING OPERATION OF
THE CONTROLLER WHEN REPRODUCING KARAOKE PIECE DATA

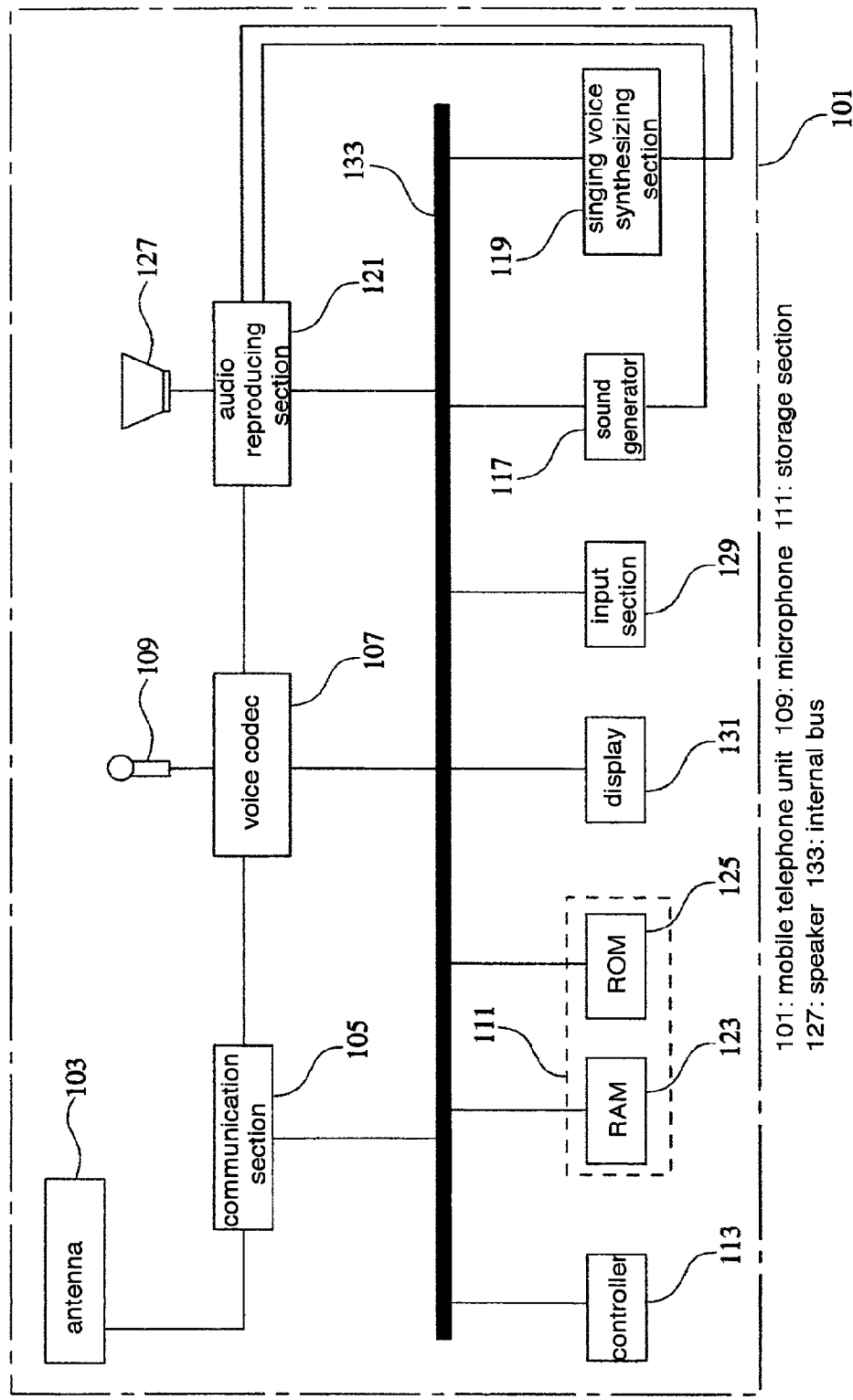

EXAMPLE OF CONFIGURATIONS OF A CONTROLLER
AND A SOUND GENERATOR OF THE MOBILE TELEPHONE
UNIT ACCORDING TO THE FIRST EMBODIMENT OF THE INVENTION

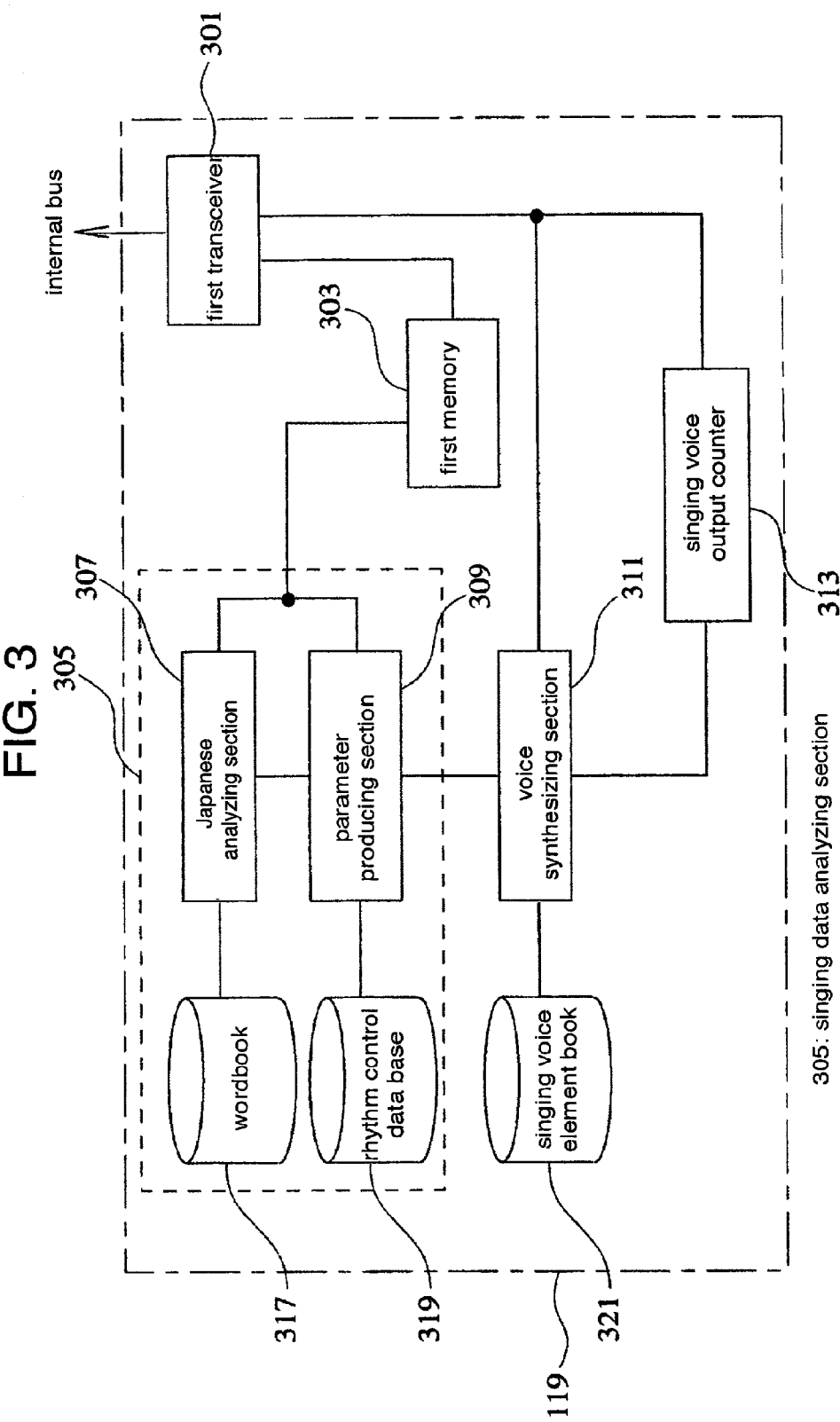

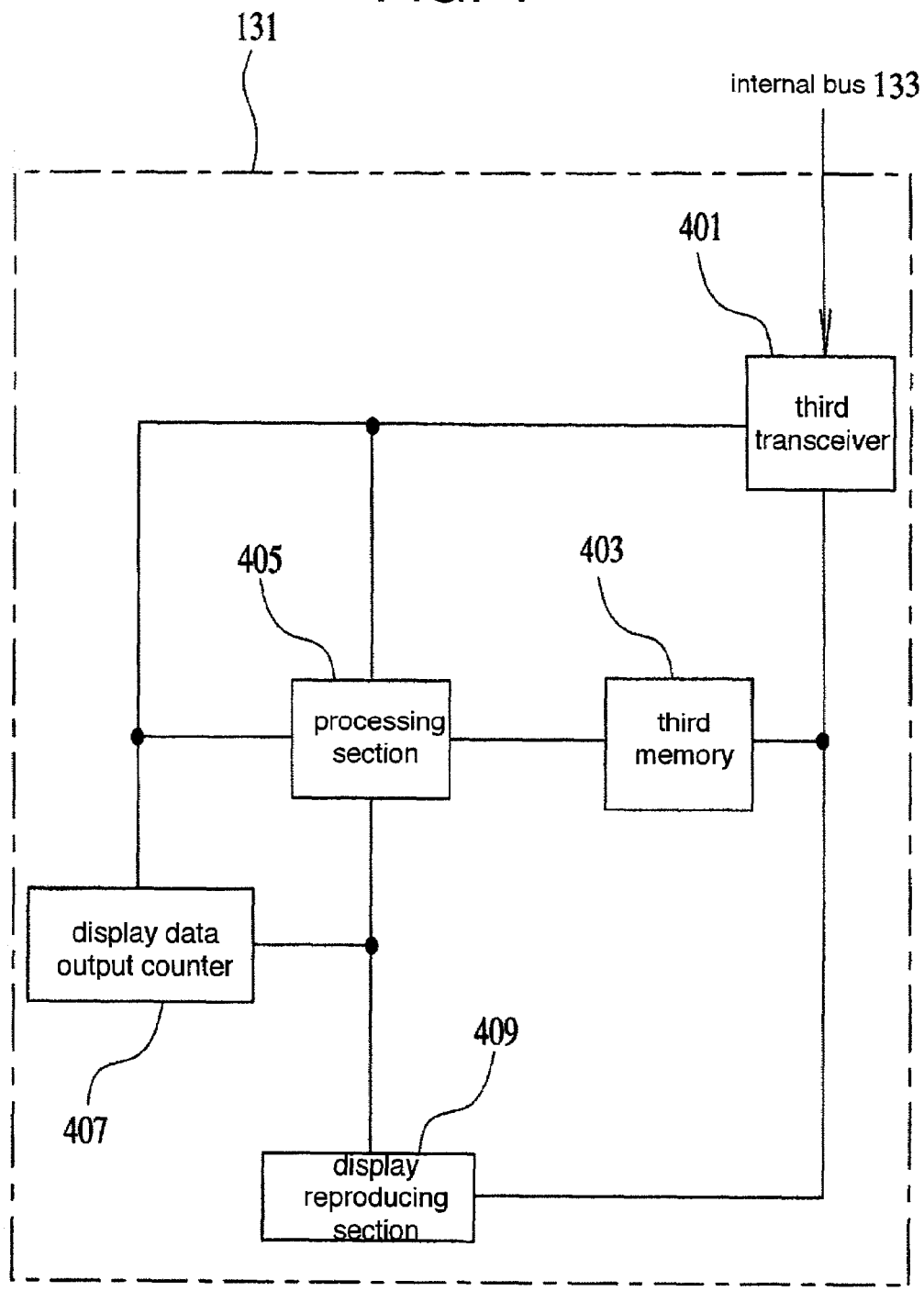
EXAMPLE OF CONFIGURATION OF
A DISPLAY OF THE MOBILE TELEPHONE
UNIT ACCORDING TO THE FIRST EMBODIMENT OF THE INVENTION

FIG. 5(A)

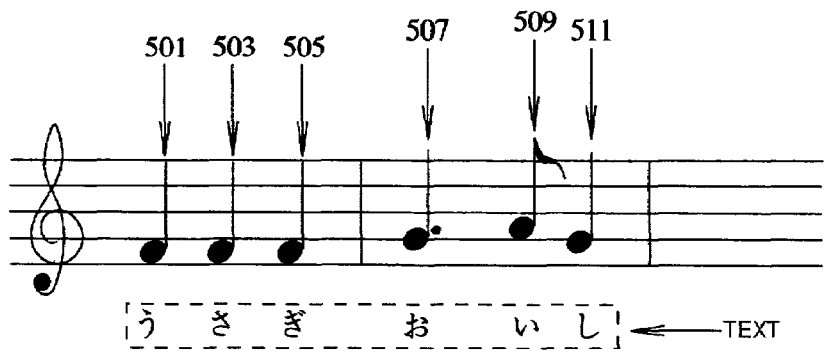

501: first sound  503: second sound  505: third sound
507: fourth sound  509: fifth sound  511: sixth sound

FIG. 5(B)

| | Singing Data | | | | | |
|---|---|---|---|---|---|---|
| Note (or Rest) Data | ファ (4) | ファ (4) | ファ (4) | ソ ($4\frac{1}{2}$) | ラ (8) | ラ (4) |
| Text Data | う | さ | ぎ | お | い | し |
| Display Data | 1 (4) | 2 (4) | 3 (4) | 4 ($4\frac{1}{2}$) | 5 (8) | 6 (4) |
| Correspondence Relation Relative to FIG. 5 (A) | first sound 501 | second sound 503 | third sound 505 | fourth sound 507 | fifth sound 509 | sixth sound 511 |

VIEW EXPLAINING SINGING DATA ACCORDING
TO THE FIRST EMBODIMENT OF THE INVENTION

601: karaoke piece data  607: part assignment data
609: part data

EXAMPLE OF CONFIGURATION OF KARAOKE PIECE
DATA ACCORDING TO THE FIRST EMBODIMENT OF THE INVENTION

FIG. 7(A)

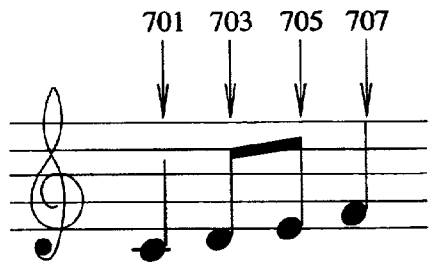

701: first sound  703: second sound  705: third sound  707: fourth sound

FIG. 7(B)

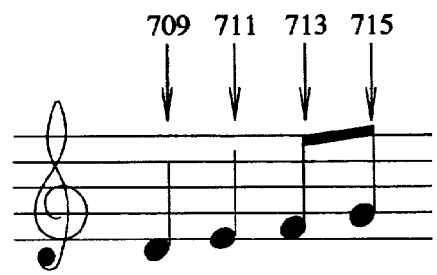

709: first sound  711: second sound  713: third sound  715: fourth sound

FIG. 7(C)

| Melody Data | | | | |
|---|---|---|---|---|
| Melody Part Assignment Data | Note (or Rest) Data | | | |
| Part 1 | ド (4) | レ (8) | ミ (8) | ファ (4) |
| Part 2 | レ (4) | ミ (4) | ファ (8) | ソ (8) |
| Correspondence Relation Relative to FIG. 7 (A) and FIG. 7 (B) | first sound 701 709 | second sound 703 711 | third sound 705 713 | fourth sound 707 715 |

VIEW EXPLAINING MELODY DATA
ACCORDING TO THE FIRST EMBODIMENT OF THE INVENTION

FLOWCHART EXPLAINING OPERATION OF
THE CONTROLLER WHEN REPRODUCING KARAOKE PIECE DATA

FLOWCHART EXPLAINING REPRODUCTION PROCESSING OF KARAOKE PIECE DATA (NO. 1)

EXAMPLE OF DISPLAY OF DISPLAY REPRODUCING SECTION

FLOWCHART EXPLAINING FAST-FORWARD, REWIND PROCESSING OF KARAOKE PIECE (NO. 1)

FLOWCHART EXPLAINING FAST-FORWARD, REWIND PROCESSING OF KARAOKE PIECE (NO. 2)

FLOWCHART SHOWING PROCESSING FOR CHANGING KARAOKE PIECE DATA 1511a, 1511b, 1511c: displayed note data  1501: displayed display data
1511a', 1511b', 1511c': changed and displayed note data
501', 503', 505': changed singing melody

VIEWS EXPLAINING PROCESSING FOR CHANGING NOTE OR REST DATA

1601: displayed display data
1615: changed portions
1613a, 1613b, 1613c, 1613d, 1613e: displayed text data

VIEW EXPLAINING PROCESSING FOR CHANGING TEXT DATA

1700: mobile telephone system
1722: first mobile telephone  1724: second mobile telephone EXAMPLE OF CONFIGURATION AND
OPERATION OF MOBILE TELEPHONE SYSTEM
ACCORDING TO A SECOND EMBODIMENT OF THE INVENTION DATA TRANSACTION OF CHANGED KARAOKE PIECE DATA
ACCORDING TO THE SECOND EMBODIMENT OF THE INVENTION 18: first radio zone  20: second radio zone
22 first mobile telephone  24: second mobile telephone

VIEWS EXPLAINING PRIOR ART

MOBILE TELEPHONE UNIT USING SINGING VOICE SYNTHESIS AND MOBILE TELEPHONE SYSTEM

TECHNICAL FIELD

The present invention relates to a mobile telephone unit capable of sounding a melody sound and a synthetic singing voice which is produced by synthesizing a singing voice at the same time, and a mobile telephone system capable of effecting communication in the mobile telephone unit.

BACKGROUND OF THE INVENTION

A communication system using a mobile telephone which is carried out commonly at present is described with reference to FIG. 19 (A). FIG. 19 (A) shows an example of a communication system for effecting a communication in the mobile telephone.

In this communication system, a first mobile telephone 22 of a user A effects radio communication directly with a first base station 14 while a second mobile telephone 24 of a user B effects radio communication directly with a second base station 16. The first base station 14 is installed in a first radio zone 18 while the second base station 16 is installed in a second radio zone 20. Further, a control station 10 is installed with respect to the first and second radio zones 18, 20 to effect communication with the first base station 14 and the second base station 16.

When the communication is effected between the first mobile telephone 22 and the second mobile telephone 24, the first mobile telephone 22 calls out the second mobile telephone 24. This calling is effected when the first mobile telephone 22 transmits a telephone number of the second mobile telephone 24 to the first base station 14. The first base station 14 receives the calling from the first mobile telephone 22 together with the telephone number of the second mobile telephone 24. Subsequently, the first base station 14 notifies the control station 10 the calling from the first mobile telephone 22. This notification is executed at the same time when the first base station 14 transmits the received telephone number of the second mobile telephone 24 to the control station 10. The control station 10 retrieves positional information of the second mobile telephone 24 together with the received telephone number from a positional data base, not shown. The control station 10 notifies the second base station 16 the calling from the first mobile telephone 22 based on the detected positional information. The second base station 16 notifies the second mobile telephone 24 the received calling from the first mobile telephone 22. An incoming call by the second mobile telephone 24 is executed upon reception of this notification.

The second mobile telephone 24 notifies the user B having the second mobile telephone 24 the incoming call by producing a calling sound when receiving an incoming call. At this time, there is a case that the calling sound is sounded as a melody signaling the incoming call (hereinafter referred to as incoming call melody). The incoming call melody is a melody sound electronically produced by the mobile telephone based on musical piece data (hereinafter referred to as piece data) stored in the mobile telephone.

A data transaction of an incoming call melody between the first mobile telephone 22 and second mobile telephone 24 is described with reference to FIG. 19 (B).

With the communication system as described above, as shown in FIG. 19 (A), a musical piece server (hereinafter referred to as piece server) 12 is installed in the control station 10. A first row in FIG. 19 (B) shows steps 26 and 28 when downloading piece data from the piece server 12 while the user A uses the first mobile telephone 22 and the user B uses the second mobile telephone 24 so as to sound favorite incoming call melody through their mobile telephones 22, 24.

Step 26 relating to the first mobile telephone 22 in the first row of FIG. 19 (B) is first described. In the first mobile telephone 22, piece number is inputted by the user A. Thereafter, the first mobile telephone 22 transmits the inputted piece number to the first base station 14. Subsequently, the control station 10 receives the piece number via the first base station 14. In the control station 10, the piece server 12 retrieves a piece data base installed therein, not shown in FIG. 19 (A), and detects piece data corresponding to the piece number. The detected piece data is downloaded by the first mobile telephone 22 via the first base station 14.

In step 28 relating to the second mobile telephone 24 in the first row of FIG. 19 (B), a step for downloading of the piece data by the second mobile telephone 24 is the same as a step for downloading the piece data by the first mobile telephone 22. Accordingly, an overlapping explanation is omitted.

A second row of FIG. 19 (B) shows steps 30 and 32 in a case where the first mobile telephone 22 of the user A calls out the second mobile telephone 24 of the user B and the second mobile telephone 24 receives this calling and sounds an incoming call melody as a calling sound. The operations of the first mobile telephone 22 and second mobile telephone 24 in steps 30 and 32 are the same as those as described with reference to FIG. 19 (A). During the operation in the second row of FIG. 19 (B), the piece server 12 does not at all get involved with the operation so that the calling by the first mobile telephone 22 and the sounding of the incoming call melody by the second mobile telephone 24 in step 32 are respectively executed.

A third row of FIG. 19 (B) shows steps 34, 36, 38 in a case where the user A notifies the user B calling by himself or herself by sounding an incoming call melody through the second mobile telephone 24 using the first mobile telephone 22. The operations of respective mobile telephones 22, 24 and the operation of the communication system shown in FIG. 19 (A) in this data transaction are disclosed in Japanese Patent Laid-Open Publication No. 2001-60990.

In step 34 shown in the third row of FIG. 19 (B), the first mobile telephone 22 calls out the second mobile telephone 24. At this time, the first mobile telephone 22 transmits the telephone number of the second mobile telephone 24 together with a piece number. The control station 10 receives the telephone number of the second mobile telephone 24 and the piece number via the first base station 14 shown in FIG. 19 (A).

In step 36, in the control station 10, the piece server 12 retrieves and detects a piece data corresponding to the received piece number in accordance with steps as described in the first row of FIG. 19 (B). Further, the control station 10 detects the second mobile telephone 24 corresponding to the received telephone number in accordance with the step described with reference to FIG. 19 (A), and transmits the retrieved piece data to the second mobile telephone 24 via the second base station 16.

The second mobile telephone 24 notifies the user B an incoming call by sounding an incoming call melody based on the received piece data in step 38. That is, the user B can recognize the calling of the first mobile telephone 22 of the user A when hearing the incoming call melody. Meanwhile, if there exists piece data in the second mobile telephone 24 corresponding to the piece number specified by the user A, the second mobile telephone 24 sounds this piece data as an incoming call melody.

Although the sounding of an incoming call melody has been described with reference to the first to third rows of FIG. 19 (B), a variety of functions can be realized by the mobile telephone. For example, it is possible to realize a karaoke function by the mobile telephone and further it is possible to guide a usage of the mobile telephone by sounding a synthesized voice utilizing voice synthesis.

The karaoke function as described above can be realized by sounding a melody in the same operation as the operation for sounding an incoming call melody as described with reference to FIG. 19 (A) and FIG. 19 (B) and by displaying lyrics or text (or image) on a display at the same time when sounding the melody. However, in the conventional mobile telephone unit, a synthesized voice corresponding to the text is not sounded at the same time when sounding a melody. That is, the synthesis and sounding of a singing voice are not effected as the karaoke function in the same manner as the guidance as described above.

A voice used for a guidance and the like is generally synthesized by storing a human voice which is actually recorded by unit of a word or paragraph as text element data (hereinafter referred to as element data) and connecting these element data. The mobile telephone requires a large number of element data relating to a singing voice so as to synthesize the singing voice corresponding to the text and sounds the synthetic singing voice in the karaoke function set forth above. Considering a communication speed in a general mobile telephone, if element data relating to a singing voice is contained in piece data relating to an incoming call melody, it is difficult for the mobile telephone to download a large number of piece data containing the element data so as to sound the piece data.

There is considered a method, for solving the foregoing problems, of previously recording element data for synthesizing a singing voice corresponding to a text in a mobile telephone, and of storing the element data in a storage section of the mobile telephone. However, according to this method, all users must have a recording unit for recording a singing voice, and hence it is considered that this method is not practical solving means considering actual using conditions of such a mobile telephone.

SUMMARY OF THE INVENTION

It is an object of the invention to provide a mobile telephone unit capable of sounding a synthetic singing voice which is obtained by synthesizing a singing voice in synchronization with a melody.

It is another object of the invention to provide a mobile telephone system by allowing the other mobile telephone unit to receive data relating to a singing voice synthesis and melody which are changed by one mobile telephone unit, and by sounding the melody and the synthetic singing voice based on the data.

To achieve the above object, the mobile telephone unit of the invention comprises a storage section for storing karaoke piece data therein, a controller for reading the karaoke piece data from the storage section, analyzing the karaoke piece data, and fetching melody information and singing voice synthesis information based on the karaoke piece data, a sound generator for analyzing the melody information received from the controller and producing multiple melody signals, a singing voice synthesizing section for analyzing the singing voice synthesis information received from the controller and producing multiple melody signals, and an audio reproducing section for receiving the multiple synthetic singing voice signals outputted from the sound generator and the multiple synthetic singing voice signals outputted from the singing voice synthesizing section in synchronization with timings when the multiple melody signals are outputted, thereby sounding a karaoke piece.

Further, the mobile telephone system of the invention effects communication between the first and second mobile telephones. The mobile telephone system of the invention comprises a first base station having a first radio zone for receiving a karaoke piece number from the first mobile telephone when directly effecting a radio communication with the first mobile telephone belonging to the first radio zone, a control station having a karaoke piece server for transmitting karaoke piece data corresponding to the karaoke piece number received from the first base station and for detecting the karaoke piece data by retrieving a karaoke piece data base located therein, the control station changing the karaoke piece data received from the first data station by changing the multiple note data or multiple text data of the singing data of the karaoke piece data, receiving the changed karaoke piece data transmitted by the first mobile telephone, and a telephone number of the second mobile telephone via the first base station and retrieving the second mobile telephone corresponding to the telephone number thereof, and a second base station having a second radio zone for transmitting the changed karaoke piece data which is received from the control station to the second mobile telephone when directly effecting a radio communication with the second mobile station belonging to the second radio zone.

BRIEF DESCRIPTION OF THE DRAWINGS

FIG. 1 is a block diagram showing an example of configuration of a mobile telephone unit according to a first embodiment of the invention;

FIG. 3 is a block diagram showing an example of configuration of a singing voice synthesizing section of the mobile telephone unit according to the first embodiment of the invention;

FIG. 4 is a block diagram showing an example of configuration of a display of the mobile telephone unit according to the first embodiment of the invention;

FIG. 5 (A) is a view showing an example of a singing melody of a singing part according to the first embodiment of the invention, and FIG. 5 (B) is a view explaining an example of singing data according to the first embodiment of the invention; according to the first embodiment;

FIG. 7 (A) and FIG. 7 (B) are views explaining melodies of a part included in a melody part according to the first embodiment, and FIG. 7 (C) is a view explaining melody data according to the first embodiment of the invention;

DETAILED DESCRIPTION OF THE INVENTION

1. A Mobile Telephone Unit

Figure 2A:
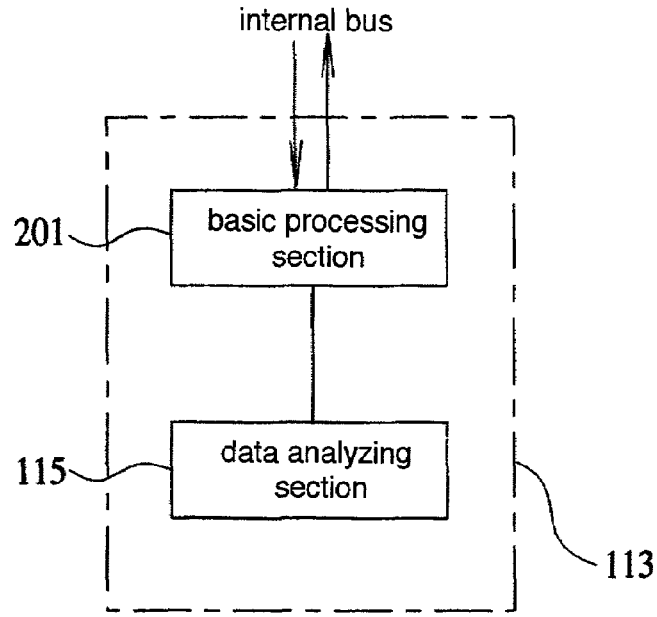
FIG. 2 is a block diagram showing examples of configurations of a controller and a sound generator of the mobile telephone unit according to the first embodiment of the invention.

A first embodiment of a mobile telephone unit according to the invention is described now.

(1) Configuration

The configuration of the mobile telephone unit according to the first embodiment is described first.

(1-1) Configuration of the Mobile Telephone Unit

The configuration of the mobile telephone unit 101 according to the first embodiment is described with reference to FIG. 1. FIG. 1 schematically shows the configuration of main constituents of the mobile telephone unit 101.

An antenna 103 and a communication section 105 for effecting transmission and reception of data by transmitting and receiving signals via the antenna 103 are provided in the mobile telephone unit 101. Data which is transmitted and received by the communication section 105 includes karaoke piece data, not shown in FIG. 1. The detail of the karaoke piece data is described later.

The mobile telephone unit 101 includes a voice codec 107 for detecting signals received from the communication section 105 and decoding the received signal into an analog voice signal. The voice codec 107 has a microphone 109 and codes a voice inputted through the microphone 109. The coded voice signal is transmitted to the communication section 105 and it is transmitted from the communication section 105 via the antenna 103 as a transmission signal.

The mobile telephone unit 101 further includes a storage section 111 for storing karaoke piece data, a controller 113 having a data analyzing section for analyzing the karaoke piece data, a sound generator 117 for producing multiple melody signals and a singing voice synthesizing section 119 for synthesizing singing voices to output them as multiple synthetic singing voice signals, and an audio reproducing section 121 for receiving the multiple melody signals and multiple synthetic singing voice signals, thereby sounding them as a karaoke piece.

The storage section 111 preferably comprises a RAM (Random Access Memory) 123 used for a working memory and the like and a ROM (Read Only Memory) 125 in which a program describing various functions of the mobile telephone unit 101 is fixedly stored. It is optimum that the karaoke piece data is stored in the RAM 123 or ROM 125 of the storage section 111.

The audio reproducing section 121 comprises an FM sound generator and the like and preferably includes a speaker 127. The audio reproducing section 121 mixes decoded analog voice signals and the like which are decoded in the voice codec 107, amplifies them and finally outputs them from the speaker 127. The detail of the function of the audio reproducing section 121 is described later.

FIG. 1 does not illustrate a data analyzing section of the controller 113. The detail of the configuration of the controller 113 is described later. The detail of the configurations of the sound generator 117 and singing voice synthesizing section 119 is also described later.

It is preferable that the mobile telephone unit 101 includes an input section 129 formed of a ten key, a jog dial and the like and a display 131 having a liquid crystal display unit and the like. The detail of the configuration of the display 131 is described later.

As shown in FIG. 1, main constituents constituting the mobile telephone unit 101, namely, the communication section 105, the voice codec 107, the RAM 123 and ROM 125 of the storage section 111, the sound generator 117, the singing voice synthesizing section 119, the audio reproducing section 121, the input section 129 and the display 131 are respectively preferably connected to the controller 113 via the internal bus 133 shown in FIG. 1.

(1-2) The Configuration of the Controller

The configuration of the controller 113 is described next with reference to FIG. 2 (A).

Figure 2B:
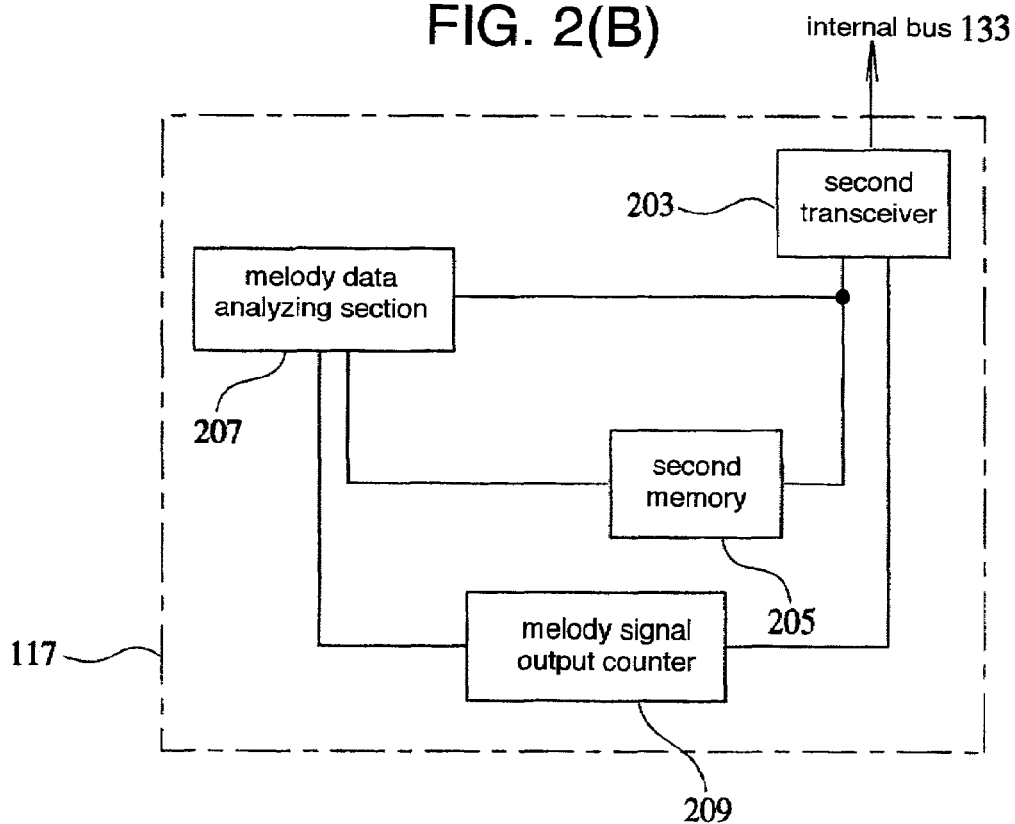

FIG. 2 (A) is a view schematically showing the configuration of the controller 113. The controller 113 has the data analyzing section 115 as described above. The controller 113 further includes a basic processing section 201 for reading karaoke data piece from the storage section 111 or a program and the like from the ROM 125. It is preferable that the basic processing section 201 and data analyzing section 115 have functions to be decided by a program read from the ROM 125.

In the controller 113, the basic processing section 201 reads the karaoke piece data and transmit it to the data analyzing section 115. The data analyzing section 115 analyzes the karaoke piece data upon reception thereof.

The karaoke piece data is data having karaoke piece information to be sounded by the audio reproducing section 121. The karaoke piece information comprises melody information relating to melodies of the multiple melody parts and a singing melody of the singing part. That is, the karaoke piece data has respective data based on the construction of information of the karaoke piece. The detail of the karaoke piece data is described later.

The data analyzing section 115 fetches melody information and information relating to a singing voice synthesis (hereinafter referred to as singing voiced synthesis information) upon completion of analysis of the karaoke piece data. The melody information means the same information as the melody information of the karaoke piece information. Further, the singing voice synthesis information means the same information as the information relating to the singing melody of the singing part in the karaoke piece information. The melody information and the singing voice synthesis information which are fetched from the data analyzing section 115 are transmitted from the basic processing section 201 to the internal bus 133.

(1-3) The Configuration of the Singing Voice Synthesizing Section

The configuration of the singing voice synthesizing section 119 is described next with reference to FIG. 3. FIG. 3 is a view schematically showing the configuration of the singing voice synthesizing section 119. The configuration of the singing voice synthesizing section 119 shown in FIG. 3 are the same as that of a conventional known singing voice synthesizing section.

A first transceiver 301 connected to the internal bus 133 for transmitting and receiving data via the internal bus 133 and a first memory 303 for storing therein the received data are respectively provided in the singing voice synthesizing section 119. According to the first embodiment, the singing voice synthesis information which is transmitted from the basic processing section 201 of the controller 113 to the internal bus 133 is received by the first transceiver 301 of the singing voice synthesizing section 119. Subsequently, the first transceiver 301 stores the received singing voice synthesis information in the first memory 303. Thereafter, the singing voice synthesis information which is read by the first memory 303 is analyzed in the singing voice synthesizing section 119.

Meanwhile, as described above, the singing voice synthesis information which is fetched from the karaoke piece data is information relating to singing melody (hereinafter referred to as singing melody information) of the singing part of the karaoke piece which is sounded by the audio reproducing section 121. An example of the singing melody information of the singing part of the karaoke piece which is sounded by the audio reproducing section 121 is illustrated in FIG. 5 (A). The note and text arranged on the staff notation are a part of singing entitled 「ふ」るさと」(hometown) approved by Education Ministry (written by Tatsuyuki Takano and composed by Teiichi Okano).

With reference to FIG. 5(A), the singing melody information is information comprising respective notes, rests arranged on the staff notation and texts respectively corresponding to the notes and rests. More in detail, aiming at a first sound 501 arranged on the staff notation, it is possible to obtain information that the first sound 501 is a sound of 「フ ァ」(fa) of scale indicated by a G clef, and has a text of 「ふ」having length of a crotchet. The similar information can be obtained from the third sound 503 to the sixth sound 511 arranged on the staff notation shown in FIG. 5 (A). Further, these first sound 501 to sixth sound 511 have to be pronounced in a timing in accordance with given tempos.

The text in FIG. 5 (A) is a style comprising a word, a paragraph and the like. Accordingly, in order to obtain a natural synthetic voice like a human singing, information of multiple notes and information of multiple rests are added to the word, paragraph and the like of the text, and then they are analyzed, then accents, pauses, and the like are decided based on the result of analysis so as to decide a rhythm control and synthesis unit, thereby synthesizing the voice.

As described above, the singing melody information of the singing part of the karaoke piece is information comprising tone pitches of the multiple notes and multiple rests arranged on the staff notation, tone lengths and tempos of the respective notes and rests, and information of construction of a style of the text. Accordingly, the singing voice synthesis information fetched from the karaoke piece data includes various data containing the information as described above.

In the singing voice synthesizing section 119 shown in FIG. 3, a singing data analyzing section 305 reads the singing voice synthesis information from the first memory 303 and analyzes it. The singing data analyzing section 305 comprises a Japanese analyzing section 307 having a wordbook 317 and a parameter producing section 309 having a rhythm control data base 319.

The Japanese analyzing section 307 analyzes the construction of a style of the text while adding information of the multiple notes and multiple rests using the wordbook 317, then decides accents, pauses, and the like based on the analysis. Subsequently, the parameter producing section 309 decides a rhythm control pattern using the rhythm control data base 319 based on the accents, pauses, tempos, the multiple rests and the multiple notes which are respectively decided by the Japanese analyzing section 307. For example, referring to FIG. 5 (A), the rhythm control pattern is a parameter relating to a frequency and continuation time of the singing voice which is synthesized for the first sound 501 to sixth sound 511. Then, the parameter producing section 309 decides a synthesis unit for preparing a synthetic voice.

A voice synthesizing section 311 has a singing voice element book 321, and fetches element data corresponding the decided synthesis unit from the singing voice element book 321, thereby synthesizing voice waveforms and producing and outputting synthetic singing voice signals in turn. For example, the voice synthesizing section 311 produces and outputs synthetic singing voice signals from the first sound 501 to sixth sound 511 in turn shown in FIG. 5 (A). That is, multiple synthetic singing voice signals are synthesized individually in turn by the voice synthesizing section 311. According to the first embodiment, it is preferable that the synthetic singing voice signals produced by the voice synthesizing section 311 are signals constituting one karaoke piece which is sounded by the audio reproducing section 121. The output of the singing voice reproducing section 313 is counted by a singing voice output counter 315.

(1-4) The Configuration of the Sound Generator

The configuration of the sound generator 117 is described next with reference to FIG. 2 (B). FIG. 2 (B) is a view schematically showing the configuration of the sound generator 117. The configuration of the sound generator 117 shown in FIG. 2 (B) is the same as that of a conventional known sound generator.

A second transceiver 203 connected to the internal bus 133 for transmitting and receiving data via the internal bus 133 and a second memory 205 for storing the received data therein are provided in the sound generator 117. According to the first embodiment, in the controller 113, the melody information transmitted from the basic processing section 201 to the internal bus 133 is received by the second transceiver 203 in the sound generator 117. Subsequently, the second transceiver 203 stores the received melody information in the second memory 205. Thereafter, the melody information read from the second memory 205 is analyzed in the sound generator 117.

As mentioned above, the melody information fetched from the karaoke piece data is information relating to melodies of the melody parts of the karaoke piece which is sounded by the audio reproducing section 121. The melody of the karaoke piece comprises melodies of the multiple melody parts. The information relating to the melodies of the respective melody parts are information excluding text from the information contained in the singing melody shown in FIG. 5 (A). Then, the karaoke piece is pronounced by the tones of the respective melody parts without accompaniment of singing voice.

In view of the difference between melody information of the melody part of the karaoke piece and singing melody information of the singing part, the melody information of the melody part of the karaoke piece is information including tone pitches of sounds of the notes and rests, the tone lengths of the notes and rests arranged on the staff notation, tones of corresponding parts and tempos. Accordingly, the melody information fetched from the karaoke piece data is comprised of various data including the information as described above.

Singing voice synthesis information received by the singing voice synthesizing section 119 is data not including tone information relating to the singing voice, but the melody information received by the sound generator 117 is data including tone information of the respective multiple melody parts.

The melody data analyzing section 207 of the sound generator 117 shown in FIG. 2 (B) reads the melody information from the second memory 205 and analyzes the information. The melody data analyzing section 207 decides tone parameters of multiple melody signals of the melody parts using tone information corresponding to the multiple melody parts of the melody information. Further, the melody data analyzing section 207 decides sound generator parameters of the multiple melody signals of the melody parts based on the tempos and the multiple notes and multiple rests of the melodies of the melody parts.

As a result of analysis carried out by steps described above, the melody data analyzing section 207 produces and outputs multiple melody signals in turn for respective multiple melody parts. According to the first embodiment, it is preferable that the multiple melody signals produced by the melody data analyzing section 207 are signals comprising one karaoke piece to be sounded by the audio reproducing section 121. The output of the melody data analyzing section 207 is counted by a melody signal output counter 211.

(1-5) The Configuration of the Display

The configuration of the display 131 is described next with reference to FIG. 4. FIG. 4. is a view schematically showing the configuration of the display 131. The configuration of the display 131 shown in FIG. 4 is the same as that of a conventional known display.

A third transceiver 401 connected to the internal bus 133 for transmitting and receiving data via the internal bus 133 and a third memory 403 for storing the received data therein are respectively provided in the display 131.

According to the first embodiment, the display 131 receives the singing voice synthesis information outputted from the controller 113 at the third transceiver 401 via the internal bus 133. Subsequently, the third transceiver 401 stores the received singing voice synthesis information in the third memory 403.

In the display 131, a processing section 405 reads the singing voice synthesis information from the third memory 403 at the same time when the output of the multiple melody signals and the synthetic singing voice signals from the sound generator 117 and the singing voice synthesizing section 119 is started. The singing voice synthesis information comprises the singing melody information of the singing part of the karaoke piece. The singing melody information is information including the multiple notes and multiple rests arranged on the staff notation shown in FIG. 5 (A) and the text given to the respective notes and rests.

The processing section 405 reads information relating to the multiple notes and multiple rests by a given unit from the singing voice synthesis information. The information read by a given unit includes the text given to the multiple notes and multiple rests. Subsequently, the processing section 405 outputs the information relating to a given unit of multiple notes and multiple rests to a display reproducing section 409.

The display reproducing section 409 of the display 131 is formed of a liquid crystal display unit and the like. The display reproducing section 409 reproduces information relating to a given unit of multiple notes and multiple rests. This is described with reference to FIG. 5 (A). For example, in the display reproducing section 409, the first sound 501 to the third sound 505 are arranged on the staff notation of the first sound 501 to sixth sound 511, namely, the notes and rests are displayed in turn by unit of three sound blocks. Further, the text given to the first sound 501 to the third sound 505 is displayed at the same time.

Meanwhile, the singing voice synthesis information of the karaoke piece data includes display data corresponding respective multiple notes and rests relating to the singing melodies. The processing section 405 reads the display data in turn and allows the display reproducing section 409 to display the read display data and allows a display data output counter 407 to count the number of outputs. The detail of the display data included in the singing voice synthesis information of the karaoke piece data is described later.

(2) The Configuration of the Karaoke Piece Data

The configuration of a karaoke piece data 601 according to the first embodiment is now described with reference to FIG. 6.

Figure 6:
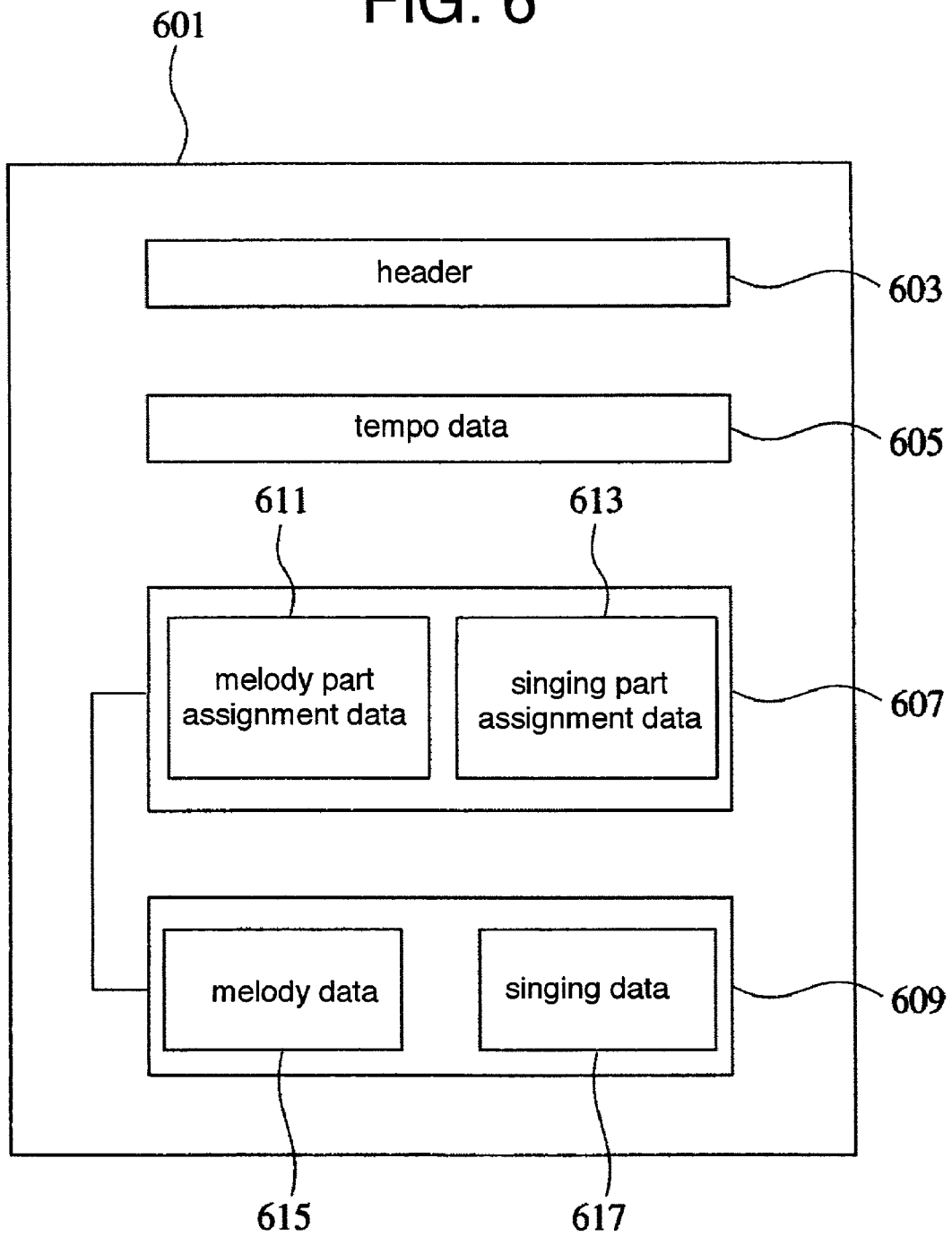
FIG. 6 is a view explaining an example of configuration of karaoke piece data according to the first embodiment.

FIG. 6 shows the configuration of the karaoke piece data 601 according to the first embodiment. The karaoke piece data 601 comprises a header 603, tempo data 605, part assignment data 607 and part data 609. The karaoke piece data 601 is data including karaoke piece information which is to be sounded by the audio reproducing section 121. In other words, the karaoke piece data 601 is data used by the mobile telephone unit 101 so as to produce melodies of the karaoke piece.

Melodies of the multiple melody parts and singing melodies of the singing part of the karaoke piece are respectively sounded by the audio reproducing section 121 based on common tempos. The tempo data 605 includes information relating to tempos.

The part data 609 is data including melody data 615 and singing data 617. The melody data 615 includes information relating to melodies of the multiple melody parts of the karaoke piece. The singing data 617 includes information singing melodies of singing parts of the karaoke piece.

The part assignment data 607 is provided in contrast to the part data 609. The part assignment data 607 includes melody part assignment data 611 and singing part assignment data 613. The melody part assignment data 611 is data for fetching the melody data 615 from the part data 609 while the singing part assignment data 613 is data for fetching the singing data 617 from the part data 609.

The singing data 617 is described next with reference to FIG. 5 (B). FIG. 5 (B) is a view explaining the singing data 617 of the karaoke piece data 601. The singing data 617 shown in FIG. 5 (B) is data for producing singing melodies of the singing parts of the karaoke piece shown in FIG. 5 (A)

Data shown in FIG. 5 (B) is merely an example explaining the singing data 617. It is practically preferable that the singing data 617 includes singing melody information of the singing parts corresponding to the melodies of the melody parts of the karaoke piece. Accordingly, it is optimum that the singing data 617 has a configuration corresponding to the melody data 615.

The singing data 617 has multiple rest data and multiple note data corresponding to the multiple notes and multiple rests constituting melodies of the singing parts of the karaoke piece. For example, the melodies of the singing parts of the karaoke piece shown in FIG. 5 (A) comprise the first sound 501 to sixth sound 511. Information of the first sound 501 to sixth sound 511 are included in the multiple note data and multiple note data of the singing data 617 shown in FIG. 5 (B).

The correspondence relation between the respective notes (or rests) data shown in FIG. 5 (B) and the first sound 501 to sixth sound 511 as illustrated in FIG. 5 (A) is shown by the correspondence relation row in the table of FIG. 5 (B). In the table of FIG. 5 (B), the tone pitches corresponding to the respective notes (or rests) data are represented by the square form of kana (hereinafter referred to as katakana). Katakana is represented based on one scale assuming one scale is represented by katakana writing (ド(do).レ(re).ミ(mi). ファ(fa).ソ(sol). ラ(la).シ(si).ド(do)). Parentheses are added to each katakana showing tone pitches in the table of FIG. 5 (B) as described above so as to represent the tone length of sound, i.e. tone length. That is, the tone pitches of the respective note data represented by katakana writing in the table of FIG. 5 (B) are based on the tone pitches of the notes shown in FIG. 5 (A) corresponding to the respective data. The tone lengths represented by the parentheses of the note data in the table of FIG. 5 (B) are also based on the tone lengths of notes shown in FIG. 5 (A) corresponding to the respective data.

More in detail, aiming at the first sound 501 shown in FIG. 5 (A), the note data corresponding to the first sound 501 in the table of 5 (B) has information of the tone pitches (the sound of "fa" of the scale represented by a G clef on the staff notation) and tone lengths (tone length represented by crotchet). The relation between the third sound 503 to sixth sound 511 shown in 5 (A) and the note data corresponding to these notes shown in the table of FIG. 5 (B) has the same correspondence applied to the note data of the first sound first sound 501.

The singing data 617 has lyrics data or text data which are given in principle to the multiple rest data and multiple note data with one with one-to one relation. Considering the correspondence relation of the text data shown in the table of FIG. 5 (B) relative to those of FIG. 5 (A), these text data are data corresponding to the text given to the first sound 501 to sixth sound 511 in FIG. 5 (A). According to the first embodiment, the text data which are given to the multiple rest data and the multiple note data are not always necessary given to the multiple rest data and multiple note data with one-to-one relation. There is a case that one text data is given to two note data and two text data are given to one note data.

The singing data 617 is display data which are given to the multiple rest data and multiple note data with one-to-one relation. The display data is employed by the display 131 as described already. In the table of FIG. 5 (B), numerals are given to the display data for the convenience of explanation in the order of use thereof by the display 131, namely, in the order of the outputs thereof to the display reproducing section 409 by the processing section 405 of the display 131 which is described with reference to FIG. 4.

The display data has information relating to the tone length of the corresponding note data (or rest data). The information relating to the tone length of the note data is shown by the parentheses represented in the third row in the table of FIG. 5 (B). Information shown by the parentheses are the same as the tone lengths of the respective note data shown by the parentheses in the first row in the table of FIG. 5 (B). The detail of the display data is described later.

The melody data 615 is now described with reference to FIG. 7. The melody data 615 has information relating to melodies of the multiple melody parts of the karaoke piece as described already. FIG. 7 shows that the melody part comprises two parts, namely, Part 1 and Part 2, wherein FIG. 7 (A) shows a melody of Part 1, FIG. 7 (B) shows a melody of Part 2. The respective notes arranged on the staff notation of FIG. 7 (A) and FIG. 7 (B) have tone pitches based on the scale represented by a G clef. The melody of Part 1 of the karaoke piece comprises first sound 701 to fourth sound 707 arranged on the staff notation shown in FIG. 7 (A). Further, the melody of Part 2 of the karaoke piece comprises first sound 709 to fourth sound 715 shown in FIG. 7 (B). The first sound 709 to fourth sound 715 constituting the melody of Part 2 correspond to the first sound 701 to fourth sound 707 constituting the melody of Part 1.

The staff notations each having multiple notes shown in FIG. 7 (A) and FIG. 7(B) are merely an example explaining melodies of the melody part of the karaoke piece. It is practically preferable that the melodies of the melody parts of the karaoke piece correspond to the singing melodies of the singing parts.

FIG. 7 (C) shows the configuration of the melody data 615 corresponding to the respective melodies shown in FIG. 7 (A) and FIG. 7(B). Data shown in FIG. 7 (C) is merely an example explaining the melody data 615.

As shown in FIG. 7 (C), the melody data 615 comprises data of the multiple melody parts (hereinafter referred to as multiple melody part data). The melody part assignment data 611 is used for fetching data of respective parts from the melody data 615. The melody part assignment data 611 have part numbers corresponding to data of the respective parts contained in the melody data 615.

The melody data 615 shown in the table of FIG. 7 (C) has data of Part 1 and the data of Part 2. In the melody data 615, data specified by part number of Part 1 of the melody part assignment data 611 is assigned to data of Part 1. On the other hand, data of Part 2 of the melody data 615 is specified by part number Part 2 of the melody part assignment data 611.

It is preferable that data of the respective melody parts of the melody part 15 comprises tones, the multiple note data and multiple rest data which respectively correspond to the respective parts.

Data of Part 1 are shown in the third row in the table of FIG. 7 (C). The data of Part 1 have the tones specified by part numbers of Part 1 of the melody part assignment data 611. It is preferable that these tones are parameters for specifying an algorithm of an FM sound generator if the audio reproducing section 121 has the FM sound generator.

The data of Part 1 have the multiple note data and multiple rest data corresponding to the first sound 701 to fourth sound 707 constituting the melody of Part 1 of the karaoke piece shown in FIG. 7 (A). That is, the respective note data of the data of Part 1 shown in the third row in the table of FIG. 7 (C) are data including information of the first sound 701 to fourth sound 707 shown in FIG. 7 (A). The information of the first sound 701 to fourth sound 707 are the same as the note data which have been described already with reference to FIG. 5 (B).

The correspondence relation between the first sound 701 to fourth sound 707 shown in FIG. 7 (A) and respective note data of the data of Part 1 shown in FIG. 7 (C) is represented in the fifth row in the table of FIG. 7 (C). The respective note data shown in the table of FIG. 7 (C) have tone pitches represented by katakana writing in the same manner as the respective note data shown in the table of FIG. 5 (B), and tone lengths are represented by the parentheses added to the katakana writing. The notations of the katakana writing and parentheses are the same as those described in FIG. 5 (B), and hence the overlapping explanation is omitted.

Data of Part 2 are shown in the fourth row in the table of FIG. 7 (C). The data of Part 2 have the same configuration as the data of Part 1. Accordingly, the overlapping explanation is omitted.

Figure 19A:
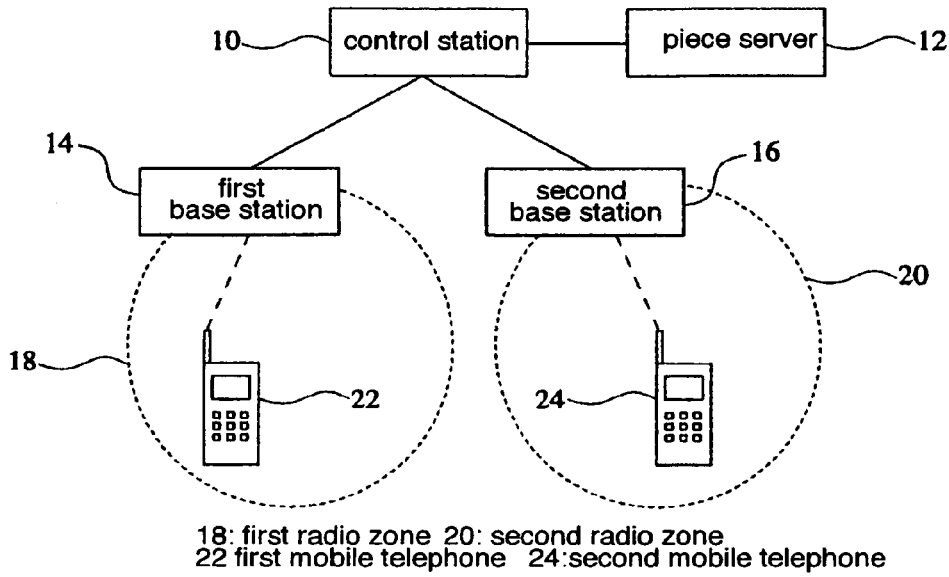
FIG. 19 (A) is a view explaining an example of configuration of a conventional mobile telephone system, and FIG. 19 (B) is a view for exampling conventional data transaction of incoming melody.

The melody information of the karaoke piece data 601 is the same information as the piece data used by the sounding of the incoming melody of the mobile telephone as described with reference to FIG. 19. Further, the singing voice synthesis information of the karaoke piece data 601 is the same information as data which has been used so far for realizing a karaoke function by the mobile telephone. Accordingly, the karaoke piece data 601 does not become immerse volumes of data. As a result, in cases where the karaoke piece data 601 is downloaded from a server, it can be easily downloaded even at a communication speed of a general mobile telephone.

(3) Operation

The operation of the mobile telephone unit 101 according to the first embodiment is described now.

(3-1) Reproduction of the Karaoke Piece Data

Figure 8:
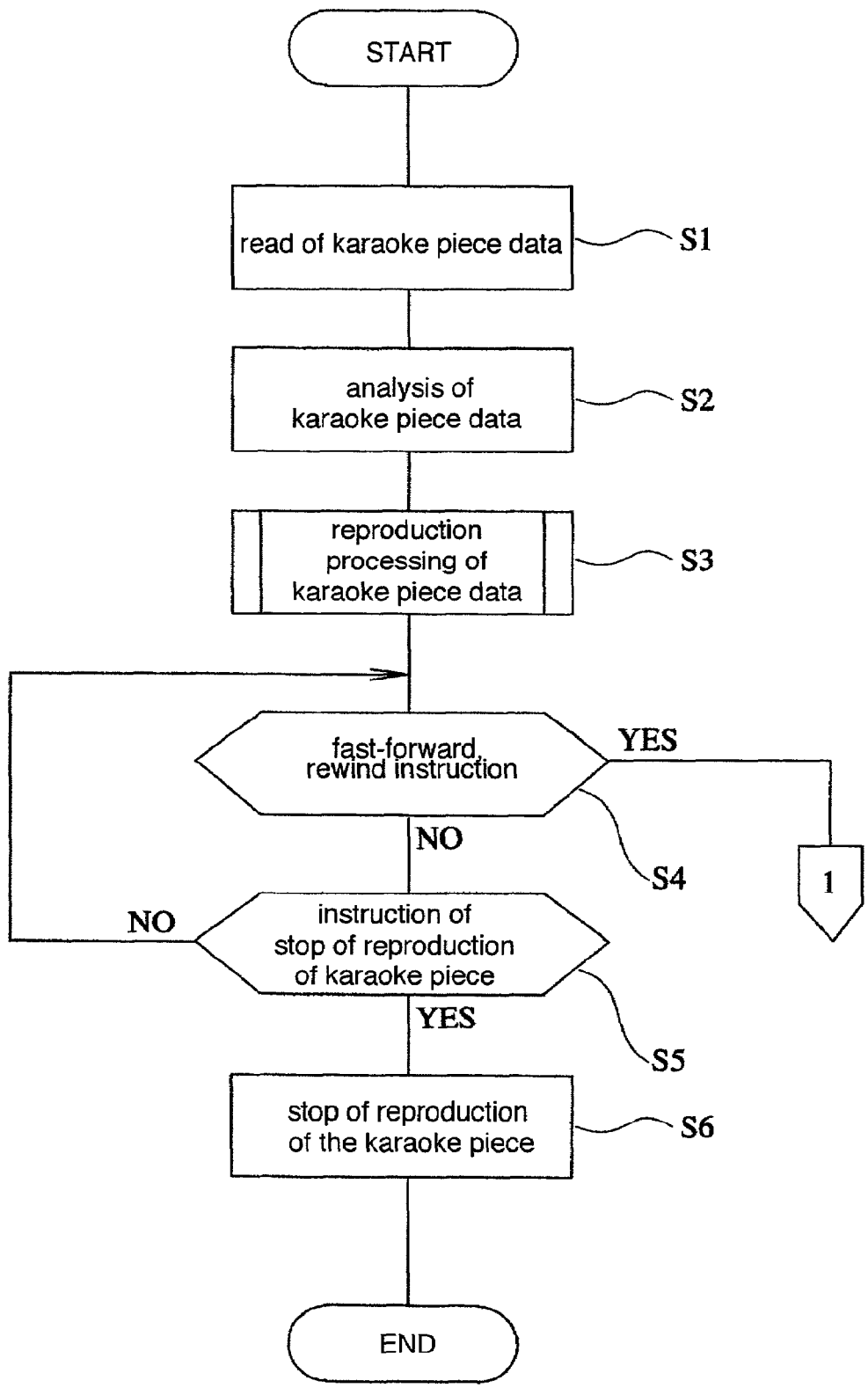
FIG. 8 is a flowchart explaining the operation of a controller when reproducing karaoke piece data according to the first embodiment.

The reproduction of the karaoke piece data 601 of the mobile telephone unit 101 according to the first embodiment is now described (3-1-1) Operation of the Controller The operation of the controller 113 of the mobile telephone unit 101 is now described in the case where the karaoke piece data 601 shown in FIG. 6 is reproduced in the mobile telephone unit 101. FIG. 8 is a flowchart explaining the operation of the controller 113 when the karaoke piece data 601 is reproduced. In the same figure, steps of each processing are represented by the combination of the symbol S and the numerals.

(S1) In the controller 113, the basic processing section 201 first reads the karaoke piece data 601 from the storage section 111. The storage section 111 means either the RAM 123 or ROM 125. It is differentiated depending on prescribed cases whether the controller 113 reads the karaoke piece data 601 from either the RAM 123 or ROM 125.

(S2) Subsequently, the basic processing section 201 transmits the read karaoke piece data 601 to the data analyzing section 115. The data analyzing section 115 analyzes the karaoke piece data 601. It is preferable that the analysis of the karaoke piece data 601 by the data analyzing section 115 is executed in the following steps.

The data analyzing section 115 fetches the melody data 615 from the part data 609 using the melody part assignment data 611 of the part assignment data 607 and also fetches the singing data 617 from the part data 609 using the singing part assignment data 613 of the part assignment data 607. Subsequently, the data analyzing section 115 fetches the melody information from the karaoke piece data 601 as information including the tempo data 605, the melody part assignment data 611 and the melody data 615. Further, the data analyzing section 115 fetches singing voice synthesis information from the karaoke piece data 601 as information including the tempo data 605 and the singing data 617.

(S3) The melody information and the singing voice synthesis information which are respectively fetched from the data analyzing section 115 are transmitted from the basic processing section 201 to the internal bus 133. More in detail, the basic processing section 201 transmits the melody information to the sound generator 117 via the internal bus 133, and also transmit the singing voice synthesis information to the singing voice synthesizing section 119 via the internal bus 133.

The reproduction processing of the karaoke piece data 601 is started by the sound generator 117 which receives the melody information and the singing voice synthesizing section 119 which received the singing voice synthesis information, so that the karaoke piece is sounded from the speaker 127 of the audio reproducing section 121. The detail of the reproduction processing of the karaoke piece data 601 by the sound generator 117 and singing voice synthesizing section 119 is described later.

The display 131 also receives the singing voice synthesis information transmitted from the basic processing section 201 via the internal bus 133. The detail of the reproduction processing of the singing voice synthesis information by the display 131 is described later.

(S4) When the reproduction of the karaoke piece is started, the basic processing section 201 of the controller 113 decides whether or not fast-forward, rewind instruction relating to the reproduction of karaoke piece, which is issued by the input through the input section 129, is received via the internal bus 133. If the fast-forward, rewind instruction is not received, a routine goes to S5 while if it is received, the routines goes to Operation 1. The detail of Operation 1 is described later.

(S5) Subsequently, the basic processing section 201 of the controller 113 decides whether or not an instruction for stopping the reproduction of the karaoke piece, which is issued by the input through the input section 129, is received via the internal bus 133. The operation of the controller 113 is returned to the operation of S4 if the stop instruction is not received while it proceeds to the operation of S6 if the stop instruction is received.

(S6) The basic processing section 201 of the controller 113 outputs a signal representing the stop of the reproduction processing of the karaoke piece, namely, a stopping signal to the sound generator 117, singing voice synthesizing section 119 and display 131. If the reproduction processing of the karaoke piece is stopped in the sound generator 117, singing voice synthesizing section 119 and display 131 which respectively received the stopping signal, all the operations of the controller 113 for reproducing the karaoke piece data 601 are ended or terminated.

(3-1-2) Reproduction Processing of Karaoke Piece Data

Figure 9:
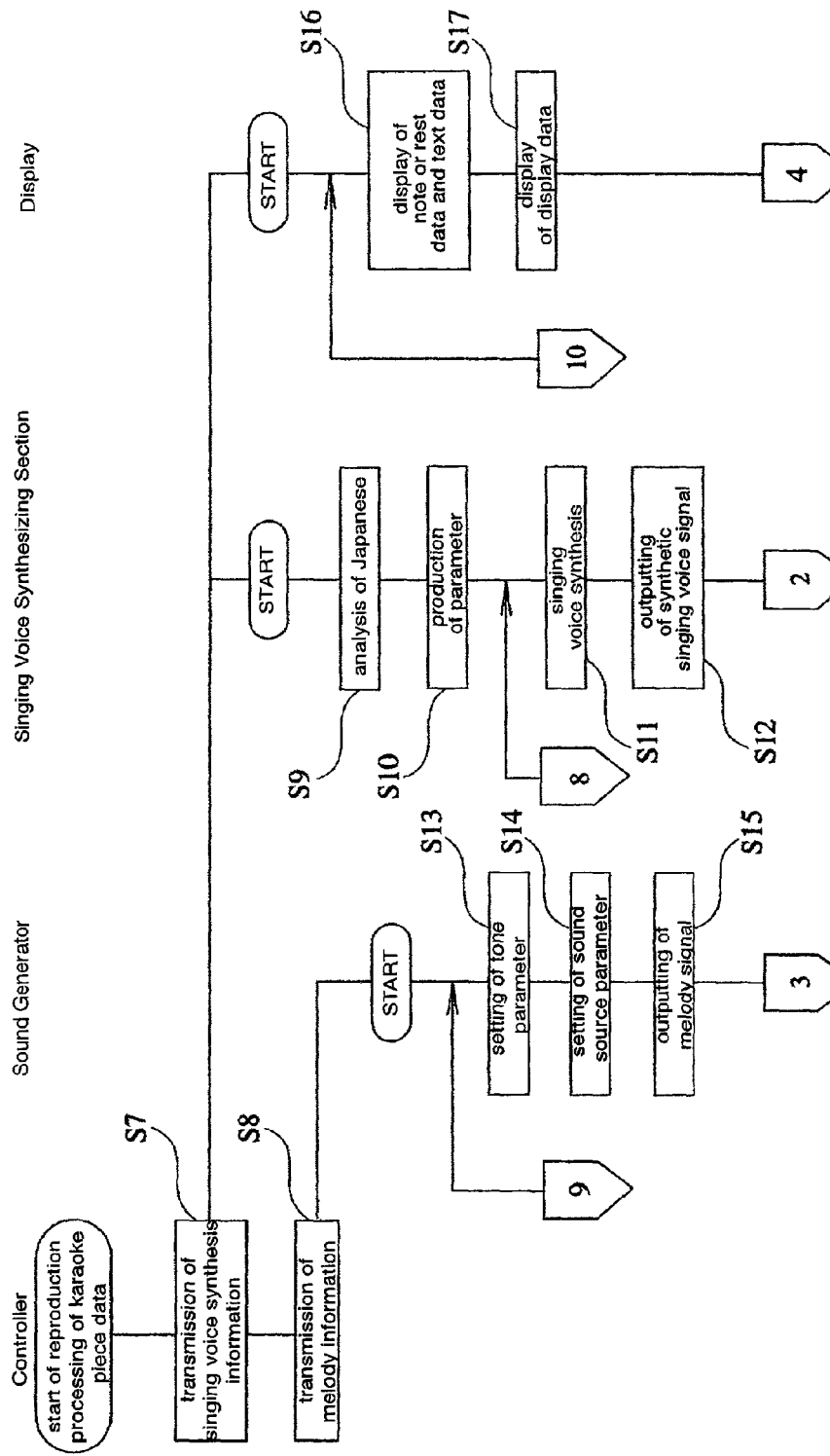
FIG. 9 is a flowchart explaining reproduction processing of karaoke piece data according to the first embodiment of the invention.
Figure 10:
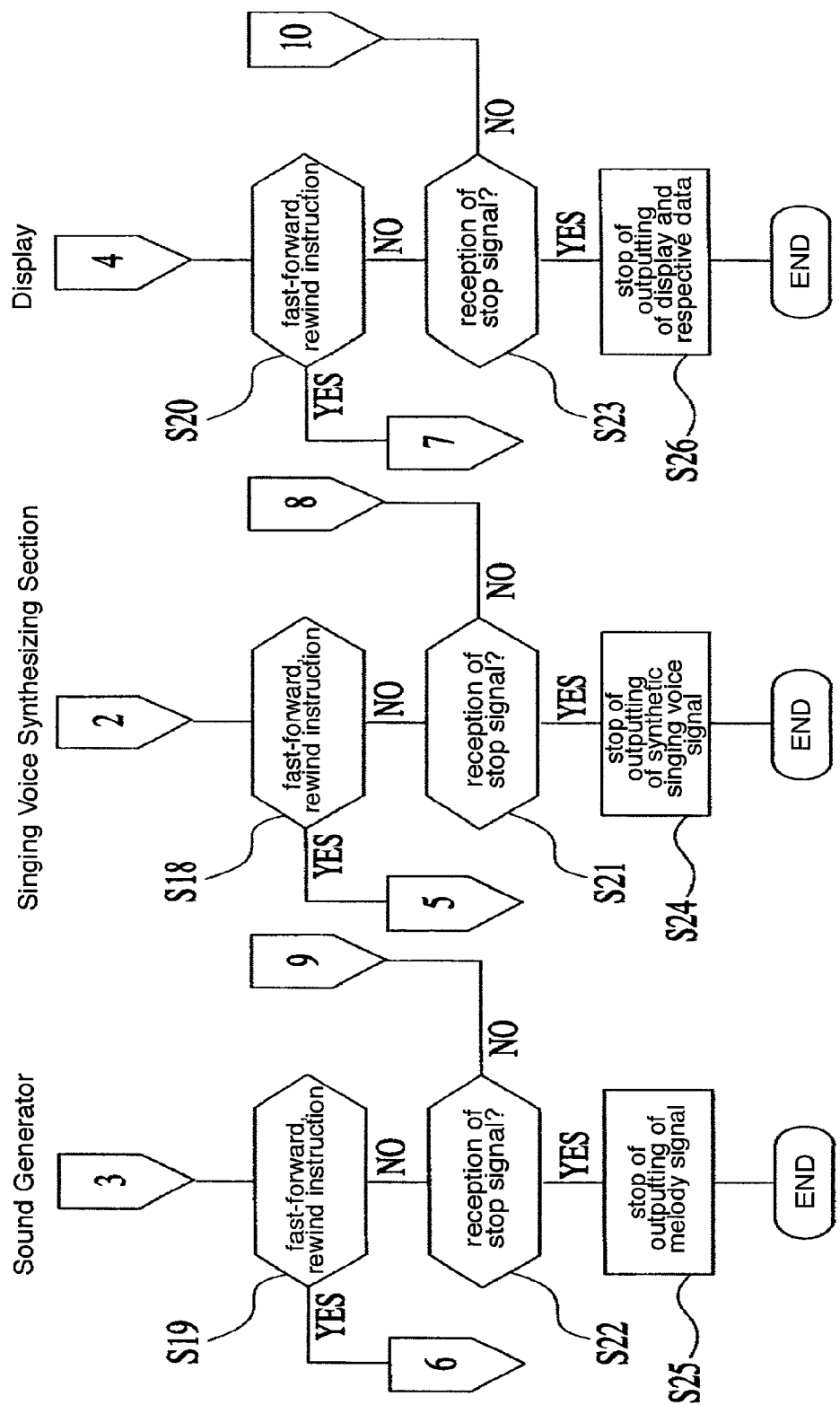
FIG. 10 is a flowchart explaining reproduction processing of karaoke piece data according to the first embodiment of the invention.

The reproduction processing of the karaoke piece data 601 shown in step S3 in the flowchart of FIG. 8 is described with reference to FIG. 9 and FIG. 10. FIG. 9 and FIG. 10 are flowcharts explaining the reproduction processing of the karaoke piece data 601. Steps of respective processings are represented by adding the symbol S in the same manner as FIG. 8.

(S7) As already described, the singing voice synthesis information fetched by the data analyzing section 115 of the controller 113 is transmitted from the basic processing section 201 to the singing voice synthesizing section 119 and the display 131 via the internal bus 133.

(S8) Further, the melody information fetched by the data analyzing section 115 of the controller 113 is transmitted from the basic processing section 201 to the sound generator 117 via the internal bus 133.

(S9) The operation of the singing voice synthesizing section 119 relating to the reproduction processing of the karaoke piece data 601 is first described.

In the singing voice synthesizing section 119, the singing data analyzing section 305 reads the singing voice synthesis information, which is received by and stored in the first transceiver 301, from the first memory 303. Thereafter, the singing data analyzing section 305 analyzes the singing voice synthesis information which is read from the first memory 303.

Referring first to the configuration of the singing voice synthesizing section 119 shown in FIG. 3, the Japanese analyzing section 307 of the singing data analyzing section 305 analyzes Japanese of the multiple text data of the singing data 617 using the wordbook 317. The analysis of Japanese is executed by the same method as the conventional known method.

The wordbook 317 records therein multiple words constituted by Japanese, kana, grammar information, information of accents and the like relating to the respective words. As described already, the multiple text data correspond text or lyrics of the singing melodies of the singing parts of the karaoke piece. For example, the texts of 「うさぎおいし」 (chasing rabbits) of the singing melodies of the singing parts shown in FIG. 5 (A) correspond to the text data represented in the third row in the table of FIG. 5 (B). When the multiple text data of 「うさぎおいし」 (chasing rabbits) are subjected to analysis of Japanese, the Japanese analyzing section 307 collates the text data corresponding to the text of the first sound 501 first, collates secondly text data corresponding to the text of the third sound 503, and subsequently collates with wordbook 317, then partitions these text data in word groups based on grammar information and the like of the wordbook 317.

Further, accents, pauses, intonations and the like of the multiple text data which are partitioned in word groups are decided based on the collation with the wordbook 317. Information relating to tone pitches and tone lengths of the note data or rest data corresponding to the text data are also used when deciding accents, pauses, intonations and the like. For example, the note data respectively corresponding to the text data represented in the third row in the table of FIG. 5 (B) are represented in the second row in the table of FIG. 5 (B). As already described, the respective note data represented in the second row have information of the tone pitches and tone lengths of the first sound 501 to sixth sound 511 shown in FIG. 5 (A). Accordingly, the accents, intonations, pauses and the like which are decided by the analysis of Japanese for the text data shown in the table of FIG. 5 (B) include information of the respective notes of the singing melodies of the karaoke piece shown in FIG. 5 (A).

(S10) In order to obtain a natural synthetic voice like a human singing, rhythm control patterns are decided for the accents, intonations, pauses and the like which are decided by the analysis of Japanese as described above. The rhythm control patterns means conversation characteristics when singing melodies of the karaoke piece are sung by a human voice. That is, the conversation characteristics mean intonations, accents, pauses and the like which are peculiar to an exhaled air of a person.

In the singing voice synthesizing section 119 having the configuration show in FIG. 3, the parameter producing section 309 receives the multiple text data subjected to the analysis of Japanese from the Japanese analyzing section 307. The parameter producing section 309 decides rhythm control patterns of the respective multiple text data which were subjected to the analysis of Japanese. The decision of the rhythm control patterns is executed by a conventional known method.

The multiple pauses and the multiple basic accents are decided for the multiple text data which were subjected to analysis of Japanese. The parameter producing section 309 decides frequencies of the multiple text data based on the multiple pauses, the multiple basic accents, the tempo data 605 of the singing voice synthesis information and the multiple rest data and multiple note data of the singing data 617. That is, these frequencies correspond to tone pitches of the synthetic voices when the multiple text data are pronounced by the synthetic voices. Subsequently, the parameter producing section 309 decides continuation time of the multiple text data based on the same information as information used when deciding the frequencies. The continuation time corresponds to the tone lengths of the synthetic voices when the multiple text data are pronounced by the synthetic voices.

The result of analysis of actual human voices is stored in the rhythm control data base 319. The parameter producing section 309 prepares some patterns and collate them with the rhythm control data base 319 when deciding the rhythm control patterns. As a result of collation, the parameter producing section 309 decides a pattern which is the closest to a pattern prepared when sung by actual human voice as the rhythm control pattern.

For example, singing melodies of the karaoke piece shown in FIG. 5 (A) are sung by synthetic singing voices according to the tempos which are set as already described. When the parameter producing section 309 receives the text data shown in FIG. 5 (B) which were subjected to analysis of Japanese according to steps as described above, it sets tempos based on the tempo data 605. The parameter producing section 309 decides the rhythm control patterns according to the foregoing steps in the manner that the first sound 501 to sixth sound 511 are pronounced by a natural synthetic voice like human singing at the timings based on respective note data of the singing data 617 shown in FIG. 5 (B).

The parameter producing section 309 decides the singing voice synthesis units of the multiple text data upon completion of decision of the rhythm control patterns.

(S11) In the singing voice synthesizing section 119 having the configuration shown in FIG. 3, the voice synthesizing section 311 receives multiple text data singing voice synthesis units of which are decided from the parameter producing section 309. The singing voice element book 321 stores therein singing voice element data. The voice synthesizing section 311 fetches singing voice element data from the singing voice element book 321 for the singing voice synthesis units and prepares multiple synthetic singing voice signals. The production of the synthetic singing voice signals in the voice synthesizing section 311 is executed by a conventional known method.

(S12) In the singing voice synthesizing section 119, the voice synthesizing section 311 prepares multiple synthetic singing voice signals one by one by the foregoing steps and transmits them to the singing voice output counter 313 and the first transceiver 301.

For example, when the voice synthesizing section 311 receives the text data shown in FIG. 5 (B) which are decided in rhythm control patterns and synthetic units by the forgoing steps, the voice synthesizing section 311 fetches singing voice element data for every synthetic units from the singing voice element book 321. The voice synthesizing section 311 produces the synthetic singing voice signals for the text data shown in FIG. 5 (B). The voice synthesizing section 311 prepares six synthetic singing voice signals corresponding to the respective sounds of the first sound 501 to sixth sound 511 in turn first from the synthetic singing voice signal corresponding to the first sound 501 and transmits the prepared synthetic singing voice signals. The transmission is effected based on information of tempos of the multiple synthetic singing voice signals based on the tempo data 605, and information of pronunciation timings of the note and rest data of the singing data 617 That is, the multiple synthetic singing voice signals which are prepared and transmitted in turn by the voice synthesizing section 311 are signals corresponding to the synthetic singing voices of the singing melodies of the karaoke piece shown in FIG. 5 (A).

The first transceiver 301 receives the synthetic singing voice signals and at the same time outputs the received synthetic singing voice signals to the audio reproducing section 121 via the internal bus 133. The singing voice output counter 313 counts the number of inputs of the signals from the voice synthesizing section 311. The detail of a subsequent Operation 2 is described later.

In a singing voice synthesis processing, there is not executed a singing voice synthesis comprising by merely connecting element data which are stored in advance such as a guidance and the like which have been conventionally carried out. The singing voice synthesizing section 119 decides the rhythm control and synthesis unit when analyzing singing voice synthesis information, thereby producing waveforms of singing voices and can synthesize voices like a natural human singing as the multiple synthetic singing voice signals. Described hereinbefore that the synthesis of Japanese by the Japanese analyzing section 307, the decision of the rhythm control patterns by the parameter producing section 309, and the preparation of synthetic singing voice signals by the voice synthesizing section 311 are executed by the conventional known method. However, the respective processings executed by the Japanese analyzing section 307, the parameter producing section 309 and the voice synthesizing section 311 are not limited to the known conventional method but desirable to be executed by desired means.

(S13) The operation of the sound generator 117 relating to the reproduction processing of the karaoke piece data 601 is described next. The sound generator 117 analyzes melody information which was received by the controller 113 via the internal bus 133 in the following steps. These analyzing steps are the same as conventional known methods.

In the sound generator 117 having the configuration shown in FIG. 2 (B), the melody data analyzing section 207 fetches multiple melody part data from the melody data 615 using the melody part assignment data 611 of the melody information.

For example, if the melody data 615 of the melody information has a configuration shown in FIG. 7 (C), the melody data analyzing section 207 fetches data of Part 1 shown in the third row in FIG. 7 (C) using the part number of Part 1 of the melody part assignment data 611. Data of part 2 shown in FIG. 7 (C) is fetched in the same manner.

Subsequently, the melody data analyzing section 207 decides tones which are specified by the part number of Part 1 of the melody part assignment data 611 based on the data of the Part 1 shown in FIG. 7 (C) as the tone parameters of the Part 1. Tone parameters of Part 2 are decided for the data of Part 2 shown in FIG. 7 (C) in the same step as described above.

(S14) Meanwhile, with reference to the foregoing description, Part 1 and the Part 2 are respectively sounded by the audio reproducing section 121 as melodies of the melody part of the karaoke piece based on given tempos. The melody data analyzing section 207 sets the tempos of the respective Part 1 and Part 2 based on the tempo data 605 of the melody information.

The multiple note data of the data of Part 1 shown in FIG. 7 (C) include information corresponding to the notes of the first sound 701 to fourth sound 707 of the melodies of Part 1 of the karaoke piece shown in FIG. 7 (A). The first sound 701 to fourth sound 707 shown in FIG. 7 (A) have to be pronounced at the timings corresponding to the first sound 701 to fourth sound 707 in accordance with the foregoing tempos in the audio reproducing section 121.

Accordingly, the melody data analyzing section 207 decides the sound generator parameters of the multiple melody signals of the Part 1 based on the timings of the multiple note data and the multiple rest data of the data of the Part 1 shown in FIG. 7 (C), and the tempos as set in the foregoing steps. The sound generator parameters of Part 2 are also decided in the same step.

(S15) As a result of analysis executed by the foregoing steps, the melody data analyzing section 207 produces multiple melody signals for Part 1 and Part 2 shown in FIG. 7 one by one in turn, and transmits the produced melody signals to the melody signal output counter 209 and the second transceiver 203.

The multiple melody signals which are produced in turn by the melody data analyzing section 207 in accordance with the foregoing steps using the melody data 615 shown in FIG. 7 (C) are signals comprised of four signals corresponding to the first sound 701 to fourth sound 707 of the Part 1 shown in FIG. 7 (A) and four signals corresponding to the first sound 709 to fourth sound 715 of the Part 2 shown in FIG. 7 (B). The melody data analyzing section 207 produces four melody signals corresponding to the first sound 701 to fourth sound 707 of the Part 1 in turn first from the melody signal corresponding to the first sound 701 and transmits them. The melody data analyzing section 207 produces four melody signals corresponding to the first sound 709 to fourth sound 715 of Part 2 in turn first from the melody signal corresponding to the first sound 709 at the same timings as the timings for transmitting four melody signals corresponding to the first sound 701 to fourth sound 707 which are produced for Part 1, and transmits them. That is, the melody data analyzing section 207 transmits the melody signals of Part 1 and the melody signals of Part 2 at the same time to the melody signal output counter 209 and the second transceiver 203. Meanwhile, the transmission is executed based on information of tempos of tempo data of the multiple melody signals or information of pronunciation timing of the note or rest data of the melody parts of the melody data 615 in the same manner as the transmission of the synthetic singing voice signals as described above. The second transceiver 203 outputs the received melody signals to the audio reproducing section 121.

That is, according to the first embodiment, when respective information transmitted from the controller 113 are received at the same time by the sound generator 117 and the singing voice synthesizing section 119, the output of the melody signals by the melody data analyzing section 207 and the output of the synthetic singing voice signals by the voice synthesizing section 311 of the singing voice synthesizing section 119 are started at the same time. Accordingly, the timing when the melody signals are outputted from the sound generator 117 is synchronized with the timing when the synthetic singing voice signals are outputted from the singing voice synthesizing section 119. The reason why the output of the melody signals and the output of the synthetic melody voice signals are synchronized with each other is that the information of the tempo of the melody signals and the information of the tempo of the synthetic singing voice signals are respectively based on the tempo data 605. In the first embodiment, the melody signals outputted from the sound generator 117 and the synthetic singing voice signals outputted from the singing voice synthesizing section 119 are inputted to the audio reproducing section 121 at the same time.

Meanwhile with the configuration shown in FIG. 2 (B), the melody signal output counter 209 counts the number of inputted signals from the melody data analyzing section 207. The detail of Operation 3 to be executed next is described later.

The audio reproducing section 121 inputs the received melody signals, e.g. to an FM sound generator, not shown in FIG. 1, thereby producing melody sounds. The audio reproducing section 121 mixes the produced melody sounds with the received synthetic singing voice signals by a mixer, not shown in FIG. 1, amplifies the mixed melody sounds and synthetic singing voice signals, then sounds the amplified melody sounds and synthetic singing voice signals from the speaker 127 as a karaoke piece.

The sound generator of the audio reproducing section 121 is not limited to an FM sound generator. The foregoing steps of sounding by the speaker 127 of the audio reproducing section 121 have been conventionally known. The sounding by the speaker 127 of the audio reproducing section 121 can be executed by arbitrary suitable means.

Although an example for analyzing melody information containing the melody data 615 having the configuration shown in FIG. 7 (C) in the sound generator 117 is explained, it is understood that the analysis of the melody information of the sound generator 117 is not limited to the foregoing example according to the first embodiment. Although the example for analyzing the melody information in the sound generator 117 by a conventional known method was described, the analysis of the melody information is not limited to the foregoing method according to the first embodiment.

(S16) The operation of the display 131 relating to the reproduction processing of the karaoke piece data 601 is described next. In the display 131, the singing voice synthesis information received from the controller 113 is stored in the third memory 403. The processing section 405 reads multiple note data and multiple rest data of the singing data 617 and text data given to the multiple note data and multiple rest data by a given unit from the third memory 403. The display reproducing section 409 receives a given unit of multiple note data and multiple rest data from the processing section 405 and displays these multiple note data and multiple rest data. Further, the display reproducing section 409 displays text data which are given to a given unit of received multiple note data and multiple rest data at the same time.

As already explained, the multiple note data and multiple rest data of the singing data 617 are data having information of the singing melodies of karaoke piece. For example, the multiple note data of the singing data 617 shown in FIG. 5 (B) include information of the notes of the first sound 501 to sixth sound 511 shown in FIG. 5 (A).

In the singing data 617 shown in FIG. 5 (B), suppose that the display of three note data as a given unit is executed by the display reproducing section 409, the processing section 405 reads every three note data from the third memory 403. The read three note data are transmitted to the display reproducing section 409. The display reproducing section 409 executes display based on the received three note data. These three note data have respective text data. The display reproducing section 409 also receives three note data and the text data corresponding thereto. Accordingly the display reproducing section 409 executes display based on the three note data together with the text data corresponding thereto.

In this case, in the display reproducing section 409, the first sound 501 to sixth sound 511 shown in FIG. 5 (A) are displayed every three sounds first from the first sound 501 on the staff notation having a G clef and also the text or lyrics of these sounds are displayed at the same time.

Further, as already explained, according to the first embodiment, the text data given to the multiple rest data and multiple note data are not always given to the multiple rest data and multiple note data with one to one relation. For example, a case where one text data is given to two note data, and a case where two text data are given to one note data are considered, however, in either case, the display based on the note data and the text data corresponding to the note data is executed in the display reproducing section 409.

Meanwhile, a timing when the voice synthesizing section 311 starts the output of the synthetic singing voice signals and a timing when the processing section 405 starts the transmission of a given units of multiple note data and multiple rest data are the same. Accordingly, the display of a given unit of multiple note data and multiple rest data by the display reproducing section 409 is started in synchronization with a timing when the audio reproducing section 121 sounds the received synthetic singing voice signals as a karaoke piece.

(S17) Further, display data are given to the respective multiple note data and multiple rest data of the singing data 617. The processing section 405 of the display 131 reads all display data of the singing data 617 and tempo data 605 from the third memory 403. The processing section 405 outputs the display data to the display reproducing section 409 and display data output counter 407 in turn based on timing information of the display data in accordance with the tempos of the tempo data 605. The display data output counter 407 counts the number of the input of the display data (this number is hereinafter referred to counted number) from the processing section 405. The detail of Operation 4 which is subsequently executed is described later.

Display data are given to the note data of the singing data 617 shown in FIG. 5 (B) corresponding to the first sound 501 to sixth sound 511 shown in FIG. 5 (A). The processing section 405 reads six display data of the singing data 617 shown in FIG. 5 (B). The processing section 405 also reads the tempo data 605 from the third memory 403.

The processing section 405 outputs the six display data corresponding to the sounds of the first sound 501 to sixth sound 511 to the display reproducing section 409 in turn first from the display data corresponding to the first sound 501 in accordance with tempos of the tempo data 605.

The display reproducing section 409 which received the display data displays display data corresponding to the multiple note data and multiple rest data for the multiple note data and multiple rest data which are displayed according to a procedure in step S16.

Figure 11:
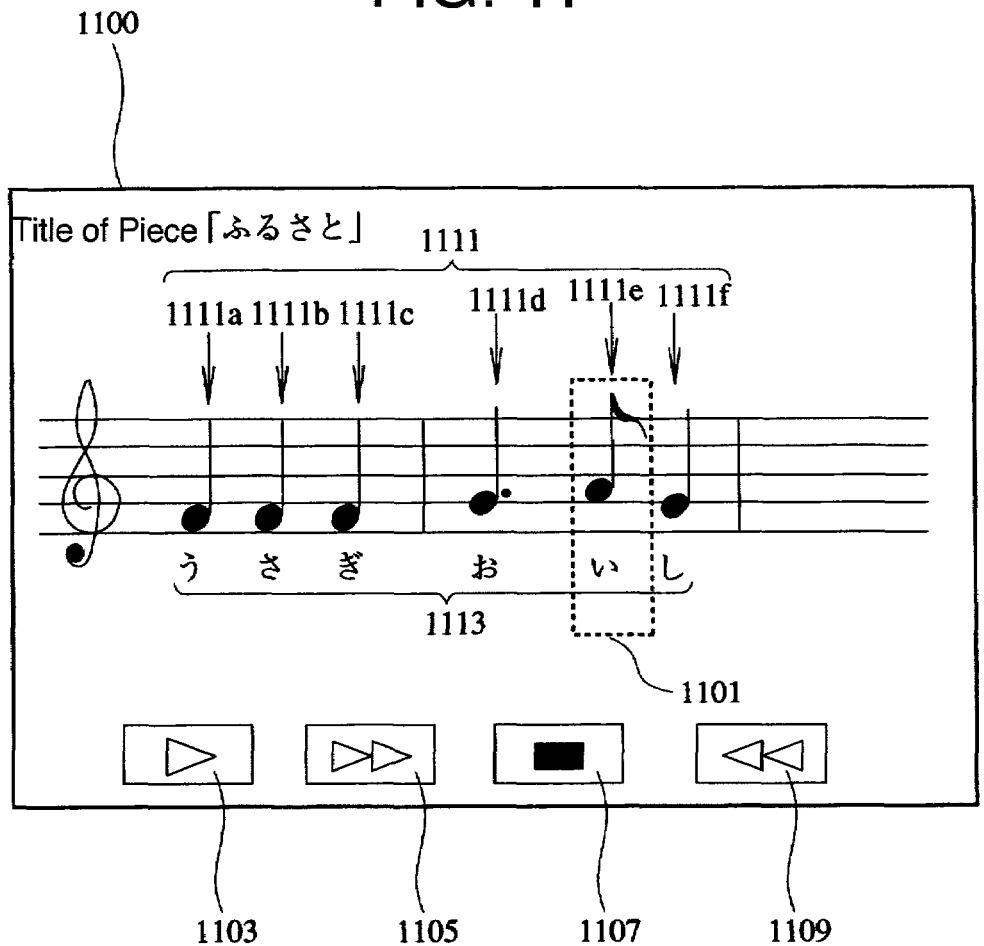
FIG. 11 is a view explaining an example of display on a display reproducing section according to the first embodiment of the invention.

FIG. 11 is a view showing an example of the display on the display reproducing section 409 of the display 131. Note data 1111 are displayed on the staff notation having a G clef in accordance with the processing in step S16. Display 1101 of the display data is preferably displayed to be emphasized in the manner that the note data 1111 arranged on the staff notation based on the respective note or rest data, and text 1113 corresponding to the note are encircled by a square shown in FIG. 11.

When the singing voice synthesis information from the controller 113 are received by the display 131 and singing voice synthesizing section 119 at the same time, the timing when the voice synthesizing section 311 starts the output of the synthetic singing voice signals and a timing when the processing section 405 starts outputs of the display data are synchronized with each other. Further, the timing when the voice synthesizing section 311 outputs the synthetic singing voice signals thereafter and the timing when the processing section 405 outputs the display data are synchronized with each other. Accordingly, the timing when the synthetic singing voice signals are sounded in the audio reproducing section 121 as a karaoke piece and the timing when the display data for displaying to emphasize the sounded synthetic singing voice signals is displayed in the display reproducing section 409 are synchronized with each other.

This is caused by the fact that information relating to tempos of the synthetic singing voice signals which are outputted from the voice synthesizing section 311 and information relating to tempos which are referred to when the processing section 405 outputs the display data are respectively based on the same tempo data 605. Another reason is that pronunciation timing information of the synthetic singing voice signals which are outputted by the voice synthesizing section 311 and display timing information of the display data outputted from the processing section 405 have the same data as explained with reference to FIG. 5 (B).

Meanwhile, as already explained, the display of the note data or rest data 1111 on a display screen 1100 is executed by a given unit. If six note data shown in FIG. 5 (B) are displayed every three units, the processing section 405 reads afresh three units of note data from the third memory 403 and outputs them to the display reproducing section 409 when the counted number of the display data output counter 407 is changed from 3 to 4. The display of the note data corresponding to the fourth sound 507 to sixth sound 511 shown in FIG. 5 (A) is executed on the display screen 1100 of the display reproducing section 409. Then, the display 1101 of the display data is effected for the display note data corresponding to the fourth sound 507 and the displayed corresponding to the fourth sound 507. That is, according to the first embodiment, the display of a given unit of multiple note data and multiple rest data as described in step S16 is preferably executed at the same timing matching with the display timing of the display data.

Operation 2 in the singing voice synthesizing section 119, Operation 3 in the sound generator 117 and Operation 4 in the display 131 are respectively described with reference to FIG. 10. Operation 2 is operations to be executed after step S18, Operation 3 is operations to be executed after step S19 and Operation 4 is operations to be executed after step S20. The respective steps are described next.

(S18) The voice synthesizing section 311 decides whether or not fast-forward, rewind instruction from the controller 113 is received via the internal bus 133 in the singing voice synthesizing section 119 which started the output of the synthetic singing voice signals by the foregoing operations in step S9 to step S12. Operation 5 is executed if the fast-forward, rewind instruction is received, while the operation of step S21 is executed if it is not received. The detail of Operation 5 is described later.

(S19) The operation which is the same as the operation executed by the singing voice synthesizing section 119 which is described in step S18 is also executed in the sound generator 117. The melody data analyzing section 207 of the sound generator 117 decides whether or not the fast-forward, rewind instruction from the controller 113 is received via the internal bus 133, and Operation 6 is executed if the fast-forward, rewind instruction is received and the operation in step S22 is executed if it is not received. The detail of Operation 6 is described later.

(S20) The operation which is the same as the operation executed by the singing voice synthesizing section 119 as describe in step S18 is also executed in the display 131. The processing section 405 of the display 131 decides whether or not the fast-forward, rewind instruction from the controller 113 is received, and Operation 7 is executed if the fast-forward, rewind instruction is received while the operation in step S23 is executed if it is not received. The detail of Operation 7 is described later.

(S21) The voice synthesizing section 311 of the singing voice synthesizing section 119 decides whether or not the stop signal from the controller 113 is received via the internal bus 133, and Operation 8 is executed if the fast-forward, rewind instruction is not received while the operation in step S24 is executed if it is received. Meanwhile, Operation 8 is to return to step S11 and to resume the operations after step S11 as shown in FIG. 9.

(S22) The melody data analyzing section 207 of the sound generator 117 decides whether or not the stop signal from the controller 113 is received via the internal bus 133, and Operation 9 is executed if the fast-forward, rewind instruction is not received while the operation in step S25 is executed if it is received. Meanwhile, Operation 9 is an operation to return to step S13 and to resume the operations after step S13 as shown in FIG. 9.

(S23) The processing section 405 of the display 131 decides whether or not the stop signal from the controller 113 is received via the internal bus 133, and Operation 10 is executed if the fast-forward, rewind instruction is not received and the operation in step S26 is executed if it is received. Meanwhile, Operation 10 is an operation to return to step S16 and to resume the operations after step S16 as shown in FIG. 9.

(S24) The voice synthesizing section 311 of the singing voice synthesizing section 119 receives the stop signal via the first transceiver 301. The voice synthesizing section 311 which received the stop signal stops the output of the synthetic singing voice signals and ends or terminates the reproduction processing of the karaoke piece data.

(S25) The melody data analyzing section 207 of the sound generator 117 receives the stop signal via the second transceiver 203. The melody data analyzing section 207 which received the stop signal stops the output of the melody signals and terminates the reproduction processing of the karaoke piece data.

(S26) The processing section 405 and the display reproducing section 409 of the display 131 receive the stop signal via the third transceiver 401. The processing section 405 which received the stop signal stops the output of the display data and the output of the a given unit of multiple note data and multiple rest data. The display reproducing section 409 which received the stop signal stops the display of respective data. The reproduction processing of the karaoke piece by the display 131 is ended or terminated.

As mentioned above, according to the reproduction processing of the karaoke piece data of the first embodiment, the input of the respective melody signals and the input of the respective synthetic singing voice signals are executed in the audio reproducing section 121 at the same time, and hence melodies and the synthetic singing voices as a karaoke piece can be sounded at the same time.

As already described, karaoke piece data used by the mobile telephone unit 101 of the first embodiment does not become vast amount of data. The melody signals of the melodies of the multiple melody parts of the karaoke piece and the synthetic singing voice signals relating to the singing melodies of the singing parts are prepared based on the karaoke piece data in the foregoing steps. As a result, according to the first embodiment, it is not necessary to record the voice element data for reproducing the karaoke piece data in advance, and the download can be easily executed as mentioned above. Further, the downloaded karaoke piece data can be stored in the storage section 111 of the mobile telephone unit 101.

Further, according to the first embodiment, the singing voices and the melody sounds are sounded at the same time and conventional karaoke functions are realized in the display 131. Since the display for emphasizing the texts corresponding to the sounded singing voices is executed in the display 131 as mentioned above, a user of the mobile telephone unit 101 of the first embodiment of the invention can easily understand the karaoke piece. That is, the mobile telephone unit of the invention has an effective karaoke function, which is different from the conventional mobile telephone unit for supporting the user of the mobile telephone unit 101.

(3-1-3) Fast-Forward, Rewind Processing Relating to the Reproduction of the Karaoke Piece In the reproduction processing of the karaoke piece data 601, the display 131 executes the display as mentioned above. Further, it is preferable that the display reproducing section 409 of the display 131 executes a reproduction button display 1103, the fast-forward button display 1105, a stop button display 1107, and a rewind button display 1109 shown in FIG. 11 in addition to the foregoing display. It is optimum that these button displays 1103 to 1109 are displays for accelerating the input through the input section 129. For example, the reproduction instruction of the karaoke piece is given to the controller 113 by an input through the input section 129 which is accelerated by the reproduction button display 1103. Similarly, the rewind or fast-forward instruction of the karaoke piece is executed by the input through the input section 129 which is accelerated by the fast-forward button display 1105 or rewind button display 1109. It is optimum that the input is executed by a user of the mobile telephone unit 101.

For example, in the case of fast-forward of the karaoke piece, the user of the mobile telephone unit 101 is accelerated by the fast-forward button display 1105 and inputs through the input section 129 by the user. The user moves the displayed display data 1101 to a note 1111e to be fast-forwarded relating to the displayed note 1111a to 1111f by the input through the input section 129 while watching the display screen 1100. Upon completion of the input of the fast-forward through the input section 129, the fast-forward processing is executed in the mobile telephone unit 101. The karaoke piece is sounded from the mobile telephone unit 101 at the position of the note 1111e which is specified by the user. When the karaoke piece is rewound, the same processing as the fast-forward processing is executed.

Figure 12:
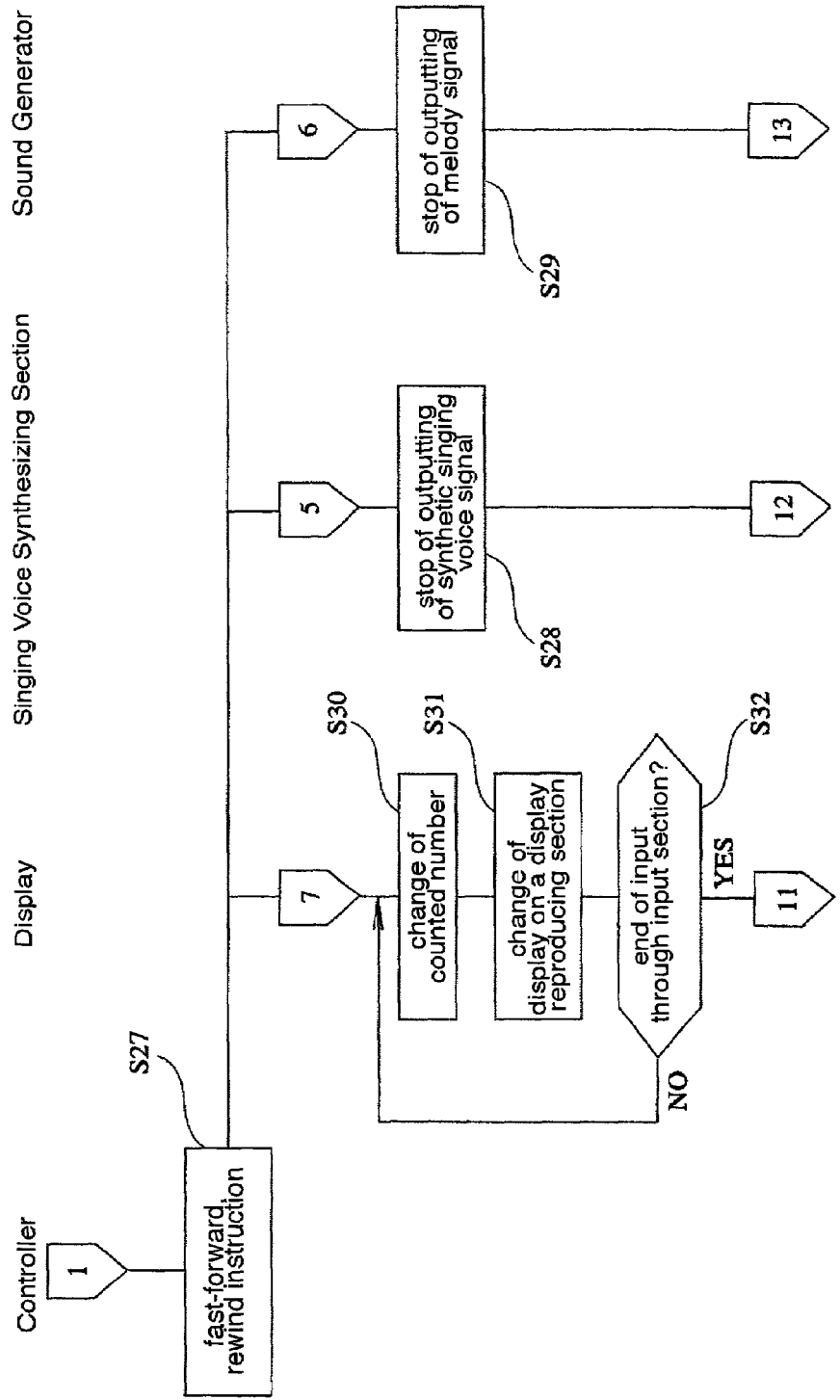
FIG. 12 is a flowchart explaining fast-forward, rewind processing of a karaoke piece according to the first embodiment of the invention.
Figure 13:
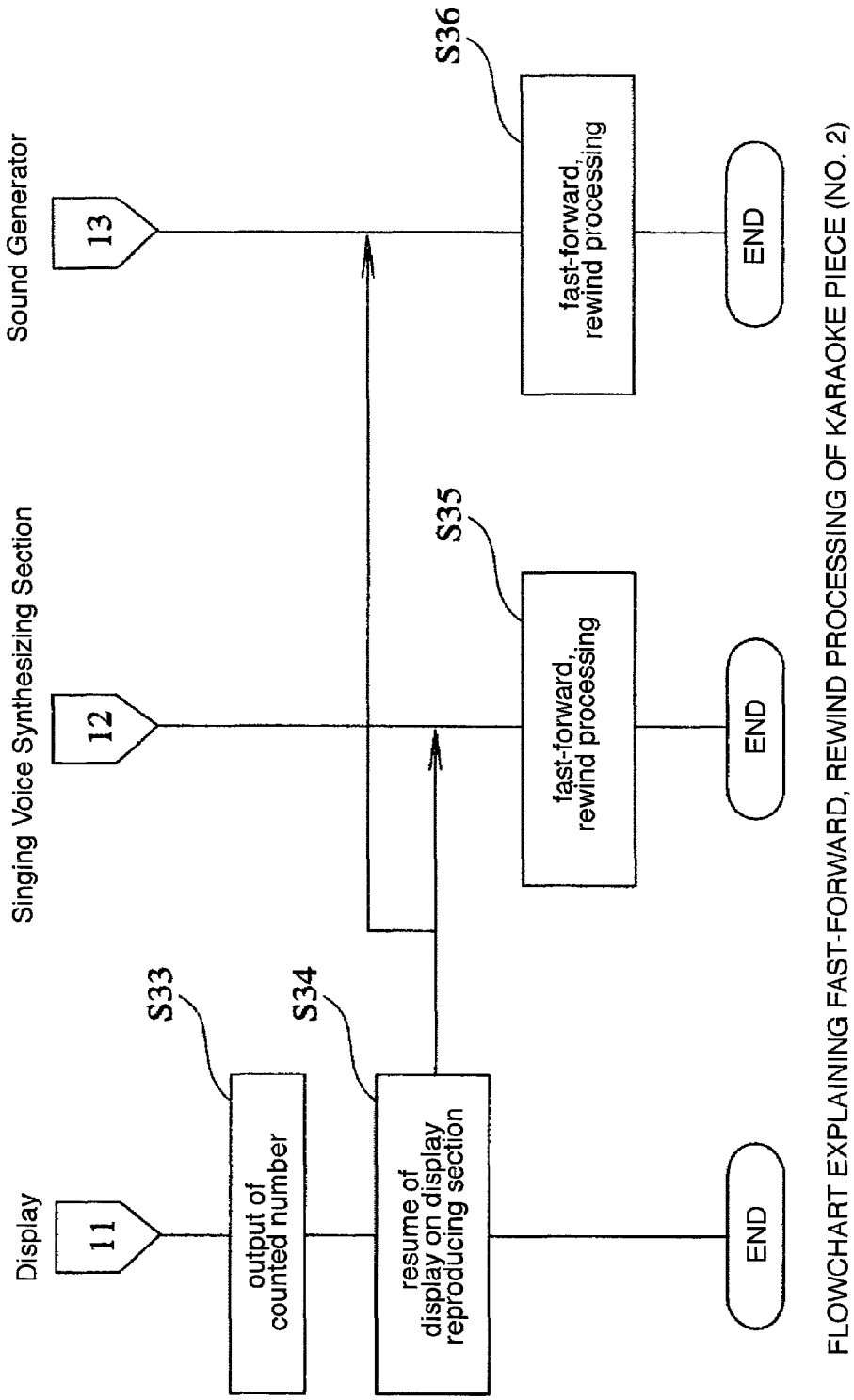
FIG. 13 is a flowchart explaining the fast-forward, rewind processing of a karaoke piece according to the first embodiment of the invention.

The fast-forward or rewind processing of the mobile telephone unit 101 is described with reference to the flowcharts of FIG. 12 and FIG. 13. The symbol S and the number are added to the respective steps of the processing in the flowcharts of FIG. 12 and FIG. 13.

The basic processing section 201 of the controller 113 receives the fast-forward, rewind instruction of the karaoke piece from the input section 129 via the internal bus 133. When the controller 113 receives rewind or fast-forward instruction of the karaoke piece, the mobile telephone unit 101 starts the fast-forward, rewind processing relating to the reproduction of the karaoke piece.

(S27) The basic processing section 201 of the controller 113 transmits the fast-forward or rewind instruction to the sound generator 117, the singing voice synthesizing section 119, and the display 131 via the internal bus 133.

(S28) The voice synthesizing section 311 of the singing voice synthesizing section 119 receives the rewind or fast-forward instruction transmitted from the controller 113 via the first transceiver 301. When the voice synthesizing section 311 received the fast-forward or rewind instruction, it stops the output of the synthetic singing voice signals. Operation 12 in the singing voice synthesizing section 119 is described with reference to FIG. 13.

(S29) Further, the melody data analyzing section 207 of the sound generator 117 receives the fast-forward or rewind instruction transmitted from the controller 113 via the second transceiver 203. The melody data analyzing section 207 stops the output of melody signals upon reception of the fast-forward, rewind instruction. Operation 13 in the sound generator 117 is described with reference to FIG. 13.

(S30) The display data output counter 407 of the display 131 receives the fast-forward or rewind instruction which is transmitted from the controller 113 via the third transceiver 401. As already described, according to the configuration of the mobile telephone unit 101 shown in FIG. 1, the input section 129 and the display 131 are connected to each other via the internal bus 133. It is preferable that the input by the user through the input section 129 as described above is a signal representing the change of the counted number by the display data output counter 407 of the display 131. The third transceiver 401 of the display 131 receives this signal from the input section 129 via the internal bus 133. The received signal through the input section 129 is inputted from the third transceiver 401 to the display data output counter 407 to change the counted number of the display data output counter 407.

When the user executes the input while accelerated by the fast-forward button display 1105 on the display screen 1100, it is preferable that the signal which the display 131 receives through the input section 129 is a signal for increasing the counted number by the display data output counter 407. When the user executes the input while accelerated by the rewind button display 1109 on the display screen 1100, it is preferable that the signal which the display 131 receives through the input section 129 is a signal for decreasing the counted number by the display data output counter 407.

(S31) The counted number of the display data output counter 407 is changed by 1 every time one signal is inputted through the input section 129. The display data output counter 407 outputs a signal showing the counted number to the processing section 405 whenever the counted number is changed.

The processing section 405 has multiple display data which has been already read from the third memory 403 in the reproduction processing of the karaoke piece as described with reference to FIG. 9 and FIG. 10. The counted number which is inputted from the display data output counter 407 becomes information for the processing section 405 to fetch specific display data from multiple display data.

As shown in FIG. 5 (B), the display data output counter 407 counts the number of outputs of the six display data corresponding to the first sound 501 to sixth sound 511 shown in FIG. 5 (A) to the display reproducing section 409 in turn first from the display data corresponding to the first sound 501 in turn by steps as described with reference to FIG. 9 and FIG. 10. If the time when the input is started through the input section 129 to change the counted number is the time when the display data corresponding to, e.g. the third sound 505 is outputted, the counted number of the display data output counter 407 becomes 3 when referring to the fourth row in FIG. 5 (B). If the input through the input section 129 is an input relating to rewind of the karaoke piece, the counted number of the display data output counter 407 is decreased from 3 toward 1 every time the input is executed. For example, if the input through the input section 129 is executed one time, the counted number of the display data output counter 407 is reduced from 3 to 2. The display data output counter 407 outputs the changed counted number 2 to the processing section 405.

The processing section 405 outputs the display data, which correspond to the counted number 2 of the six display data corresponding to the first sound 501 to sixth sound 511 stored therein shown in FIG. 5 (B), to the display reproducing section 409. The display data outputted at this time is display data corresponding to the third sound 503 as shown FIG. 5 (A). The display reproducing section 409 displays the received display data. With reference to FIG. 11, the display 1101 of the display data becomes display for emphasizing the second sound 1111b.

The user can know which note of the notes constituting the karaoke piece is selected by himself or herself while watching this display. The user executes the input of rewind while watching the display 1101 of the display data on the display screen 1100. The input of the fast-forward by the user is executed in the same operation as that when the input of rewind is executed.

The display of the note data or rest data 1111 on the display screen 1100 is executed by a given unit as already described. For example, if six note data shown in FIG. 5 (B) are displayed every three units, the processing section 405 reads afresh the three units of note data from the third memory 403 and output them to the display reproducing section 409 when the counted number of the display data output counter 407 is changed from 3 to 4. The display of the note data corresponding to the fourth sound 507 to sixth sound 511 shown in FIG. 5 (A) is executed on the display screen 1100 of the display reproducing section 409. The display 1101 of the display data is executed for the thus displayed note data corresponding to the fourth sound 507 and the displayed text data corresponding to the fourth sound 507.

(S32) The processing section 405 decides whether or not the input of the rewind or fast-forward through the input section 129 is terminated when executing processing for changing the display of the display reproducing section 409 as described in step S31. If the input of the rewind or fast-forward is terminated, the routine goes to Operation 11 while if it is not terminated, the routines returns to the operation of step S30. It is preferable that the processing section 405 decides the input through the input section 129 is terminated at the time when the signal from the input section 129 is not received by the display 131.

Operations 11 to 13 are described with reference to FIG. 13. Operation 11 which is executed in the display 131 is first described.

(S33) In the display 131, if the reception of signal through the input section 129 is terminated, the input of the counted number from the display data output counter 407 to the processing section 405 is also terminated. The display data output counter 407 outputs the counted numbers to the internal bus 133 via the third transceiver 401 when the reception of the signal through the input section 129 is terminated.

(S34) Thereafter, the processing section 405 starts the output of the display data in the same steps as those described with reference to FIG. 9 and FIG. 10 following the output of display data, which are outputted when the reception of signals through the input section 129 is terminated. Further, the output of a given unit of multiple note data and multiple rest data is executed by the processing section 405 in the same steps as those described with reference to FIG. 9 and FIG. 10 at the timing matching with the timing for outputting the display data. If the display is resumed in the display reproducing section 409 by the forgoing steps, the fast-forward or rewind processing of the display 131 is terminated.

(S35) The signal showing the counted number outputted from the display 131 is received by the singing voice synthesizing section 119 via the internal bus 133. This signal is received by the voice synthesizing section 311 and singing voice output counter 313 of the singing voice synthesizing section 119 via the first transceiver 301.

The voice synthesizing section 311 has multiple text data, which are decided in singing voice synthesis units, and received from the parameter producing section 309 as already described. The voice synthesizing section 311 prepares and outputs the synthetic singing voice signal which are specified among the multiple synthetic singing voice signals by the inputted counted number in the same steps as those described with reference to FIG. 9 and FIG. 10. The specification of the synthetic singing voice signals by the counted number is executed in the same steps as those made by the display 131 in step S31.

The singing voice output counter 313 changes the counted number at the time when the user of the mobile telephone unit 101 starts the input of the fast-forward or rewind to the counted number which is received from the display 131.

The output of the synthetic singing voice signals by the voice synthesizing section 311 is executed in the same steps as those described with reference to FIG. 9 and FIG. 10. Further, in step S34, the timing when the third memory 403 of the display 131 resumes the output of the display data and the output of a given unit of multiple note data and multiple rest data and the timing when the voice synthesizing section 311 resumes the output of the synthetic singing voice signals are synchronized with each other. Accordingly, as already described with reference to FIG. 11, the timing when the synthetic singing voice signals are sounded from the audio reproducing section 121 and the timing when the display 1101 of the display data for emphasizing the note 1111 corresponding to the synthetic singing voice signals is executed by the display reproducing section 409 are synchronized with each other.

The fast-forward or rewind processing is entirely terminated in the singing voice synthesizing section 119 after the voice synthesizing section 311 resumes the output of the synthetic singing voice signals.

(S36) The signal showing the counted number outputted from the display 131 is received by the sound generator 117 via the internal bus 133. The thus received signal is inputted to the melody data analyzing section 207 and melody signal output counter 209 of the sound generator 117 via the second transceiver 203.

The melody data analyzing section 207 prepares and outputs the melody signals which are specified by the inputted number of count in accordance with the same steps as those described with reference to FIG. 9 and FIG. 10. The specification of the melody signals by the counted number is executed by the same steps as those made by the display 131 in step S31.

The melody signal output counter 209 changes the counted number at the time when the input of the fast-forward or rewind is started by the user of the mobile telephone unit 101, to the inputted number of count.

The output of the melody signals are outputted thereafter by the melody data analyzing section 207 in the same steps as those described with reference to FIG. 9 and FIG. 10. Meanwhile, in step S35, the timing when the voice synthesizing section 311 of the singing voice synthesizing section 119 resumes the output of the synthetic singing voice signals and the timing when the melody data analyzing section 207 resumes the output of the melody signals are synchronized with each other. Accordingly, the same steps as those described with reference to FIG. 9 and FIG. 10 are executed in the audio reproducing section 121. As a result, the singing voices and melody sounds are sounded based on the notes of the karaoke piece specified by the user of the mobile telephone unit 101. The display as described with reference to FIG. 9, FIG. 10 and FIG. 11 relating to the sounded singing voices is executed on the display screen 1100 of the display reproducing section 409 of the display 131.

After the output of the melody signals is resumed by the melody data analyzing section 207, the fast-forward or rewind processing is entirely terminated in the sound generator 117.

As described above, according to the fast-forward, rewind processing relating to the reproduction of the karaoke piece, the user of the mobile telephone unit 101 can select a desired melody of the karaoke piece and listen the selected melody repeatedly by operating the foregoing operation while watching the display screen 1100 of the display reproducing section 409. That is, a user-friendliness of the karaoke function is enhanced and the understanding of the karaoke piece by the user of the mobile telephone unit 101 is easily made by executing the fast-forward and rewind processing as described above as described with reference to FIG. 9 and FIG. 10.

(3-2) Change of Karaoke Piece Data

According to the mobile telephone unit 101 of the first embodiment, it is possible to change karaoke piece data which is stored in the storage section 111.

A user of the mobile telephone unit 101 executes processing while watching the display screen 1100 shown in FIG. 11 in the same manner as fast-forward or rewind processing as described with reference to FIG. 12 and FIG. 13 when changing the karaoke piece data. At that time, the user moves the displayed display data 1101 relating to the displayed notes 1111a to 1111f or the displayed text data 1113 to the notes or texts to be changed by the input through the input section 129, thereafter the user changes the note data corresponding to the notes or the text data corresponding to the texts.

The processing for changing karaoke piece data in the mobile telephone unit 101 is described with reference to the flowchart of FIG. 14. The symbol S and the number are added to the respective steps of the processing in FIG. 14.

It is preferable that the instruction for changing the karaoke piece data is executed when a user of the mobile telephone unit 101 inputs it through the input section 129. For example, the instruction for changing the karaoke piece is executed by inputting the title of the karaoke piece which is intended to be changed by the user of the mobile telephone unit 101 through the input section 129.

The instruction for changing the karaoke piece data through the input section 129 is received by the basic processing section 201 of the controller 113 via the internal bus 133. When the controller 113 receives the instruction for changing the karaoke piece data, the mobile telephone unit 101 starts the processing for changing the karaoke piece data.

(S37) The basic processing section 201 of the controller 113 reads the karaoke piece data 601 from the storage section 111. For example, if the instruction for changing the karaoke piece data is executed by inputting the title of the karaoke piece through the input section 129, the basic processing section 201 receives the title of the inputted karaoke piece. Thereafter, the karaoke piece data 601 corresponding to the title of the karaoke piece is read from the storage section 111. The storage section 111 means either the RAM 123 or ROM 125 as described in step S1 in the flowchart shown of FIG. 8.

Thereafter, the singing data 617 is fetched from the karaoke piece data 601 by the analysis of the data analyzing section 115 which is executed in the same step as step S2 in the flowchart of FIG. 8 as already described. Subsequently, the fetched singing data 617 is transmitted by the basic processing section 201 to the display 131 together with the instruction for changing data via the internal bus 133.

The singing data 617 transmitted from the controller 113 is received by the third transceiver 401 of the display 131, then it is stored in the third memory 403. Further, the instruction for changing data which is transmitted from the controller 113 is received by the processing section 405 of the display 131 via the third transceiver 401. When the processing section 405 receives the instruction for changing data, the display 131 starts the processing for changing the karaoke piece data. The change of the karaoke piece data is executed when the display 131 changes the note or rest data of the singing data 617 which is received from the controller 113 or changes the text data.

Figure 14:
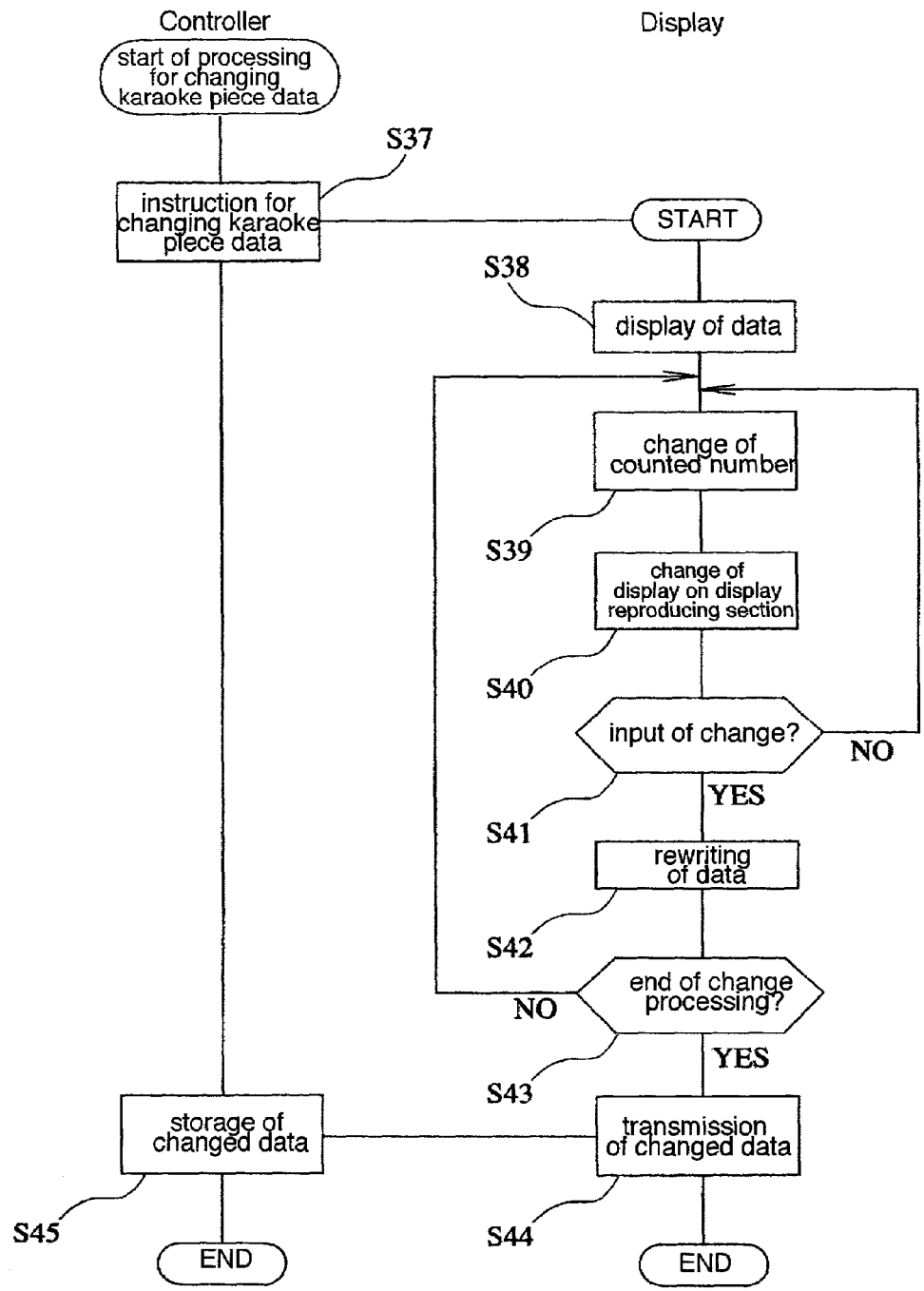
FIG. 14 is a flowchart explaining processing for changing karaoke piece data according to the first embodiment of the invention.

Operations of step S38 and succeeding steps shown in the flowchart of FIG. 14 are described separately with reference to a case where the note or rest data of the singing data 617 are changed and another case where the text data are changed.

(3-2-1) Change of Note or Rest Data

The processing for changing note or rest data of the karaoke piece data is describe first.

(S38) The processing section 405 reads the multiple note data and multiple rest data of the singing data 617 from the third memory 403 by a given unit. The display reproducing section 409 receives a given unit of multiple note data and multiple rest data from the processing section 405 and displays these multiple note data and multiple rest data.

Figure 15A:
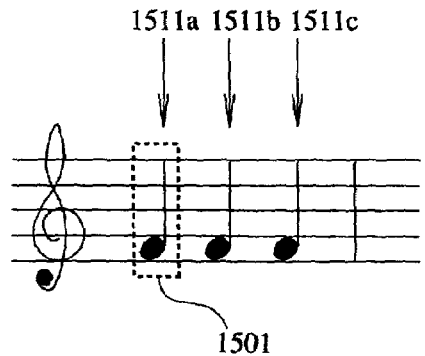
FIG. 15 (A) is a view showing an example of a display screen of a display reproducing section when note or rest data is changed according to the first embodiment of the invention, FIG. 15 (B) is a view showing an example of the display screen of the display reproducing section after the note or rest data was changed according to the first embodiment of the invention, and FIG. 15 (C) is a view showing an example of changed singing melody according to the first embodiment of the invention.

For example, if the processing section 405 reads the note data of the singing data 617 shown in FIG. 5 (B) by three units, the note data corresponding to the first sound 501 to third sound 503 are displayed on a display screen of the display reproducing section 409. The display on the display screen at this time is illustrated in FIG. 15 (A). FIG. 15 (A) shows only the display content of the display screen. The display of the note data corresponding to the first sound 501 to third sound 505 shown in FIG. 5 (B) is effected as the note 1151a to the note 1151c arranged on the staff notation having a G clef.

Next in the display 131, the processing section 405 reads the display data of the singing data 617 from the third memory 403. As already described, although the display data are given to the multiple note data and multiple rest data of the singing data 617, the processing section 405 reads display data corresponding to the note data or rest data of the first sound of the singing melody of the singing part of the karaoke piece. The read display data is outputted to the display reproducing section 409 and the display reproducing section 409 displays the read display data on the display screen.

For example, in accordance with the foregoing steps, if the display reproducing section 409 effects the display of the note data shown in FIG. 15 (A), the display 1501 for the note data 1511a corresponding to the displayed first sound 501 is effected in the display reproducing section 409 in accordance with the foregoing steps.

(S39) Subsequently, the display data output counter 407 executes the processing for changing the counted number when a user of the mobile telephone unit 101 inputs it through the input section 129. This processing is the same as that which is executed in step S30 in the flowchart of FIG. 12. Accordingly, the overlapping explanation is omitted.

The input through the input section 129 is either an input for incrementing the counted number of the display data output counter 407 or an input for decrementing the counted number. The display shown in FIG. 15 (A) and together with button displays 1103 to 1109 shown in FIG. 11 in the display reproducing section 409 are respectively effected thereby accelerating the input by the user of the mobile telephone unit 101.

(S40) Subsequently, the processing for changing display of the display reproducing section 409 to be executed in the display 131 is the same as the processing which is executed in step S31 in the flowchart of FIG. 12. Accordingly, the overlapping explanation is omitted.

(S41) When the operations of steps S39 and S40 are executed on the display 131, the processing section 405 decides whether or not the change is inputted through the input section 129. If inputted, the processing in step S42 is executed while if not inputted, it returns to the operation in step S39. The input of change through the input section 129 means an input representing the change of the note data corresponding to the displayed display data 1501 shown in FIG. 15 (A). If the display data 1501 is displayed for the rest, an input representing the change of the rest data corresponding to the rest is executed through the input section 129.

(S42) If the input of change through the input section 129 is executed, a signal representing the change of the tone pitches and tone lengths of the notes corresponding to the displayed display data 1501 is transmitted from the input section 129 to the display 131 via the internal bus 133. If the display data 1501 is displayed for rests, a signal representing the change of the lengths of the rests are transmitted from the input section 129 to the display 131.

In the display 131, the signal representing the change of the sound is received by the processing section 405 via the third transceiver 401. The processing section 405 rewrites the note or rest data corresponding to the displayed display data 1501 in accordance with information of the received signal. The rewritten note or rest data are outputted from the processing section 405 to the display reproducing section 409.

The note or rest data stored in the third memory 403 are changed to inputted data when the rewritten note or rest data are inputted. The display reproducing section 409 displays the rewritten note or rest data receiving by the processing section 405 on the data screen.

For example, if this is described with reference to FIG. 15 (A), the input representing the change of the tone pitch " " (fa) in the scale shown by a G clef of the displayed note data corresponding to the displayed display data 1501, namely, of the note 1511a to the tone pitch "ド" (do) is executed in the input section 129. The input of the change is received by the third transceiver 401 of the display 131 via the internal bus 133, then it is further received by the processing section 405. The processing section 405 rewrites the note data in steps as described above and outputs the rewritten note data to the third memory 403 and the display reproducing section 409.

The singing data 617 as described with reference to FIG. 5 (B) are stored in the third memory 403. The note data which the third memory 403 received from the processing section 405 is data obtained by rewriting the note data of the first sound 501 represented in the second row of the table of FIG. 5 (B). Accordingly, the note data of the first sound 501 stored in the third memory 403 is changed to the note data received from the processing section 405.

Further, the display reproducing section 409 displays the rewritten note or rest data received from the processing section 405 on the data screen. As a result, the note 1511a is displayed on the display screen while the tone pitch thereof is changed to "ド" (do).

(S43) In the display 131, the processing section 405 decides whether or not the foregoing change processing is terminated. If the processing section 405 decides that the change processing is terminated, the routine goes to step S44, while if it decides that the change processing is not terminated, the routine returns to step S39.

The processing section 405 decides that the change processing terminates when the input representing the change of sound and the input representing the change of counted number are terminated through the input section 129.

(S44) The processing section 405 fetches the singing data 617 containing the changed multiple note or rest data which are stored in the third memory 403 upon completion of the change processing. The fetched singing data 617 is outputted to the internal bus 133 via the third transceiver 401. Thereafter, the processing for changing the note or rest data in the display 131 is entirely completed or terminated.

Figure 15B:
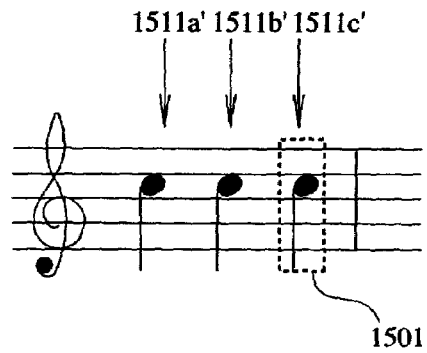
Figure 15C:
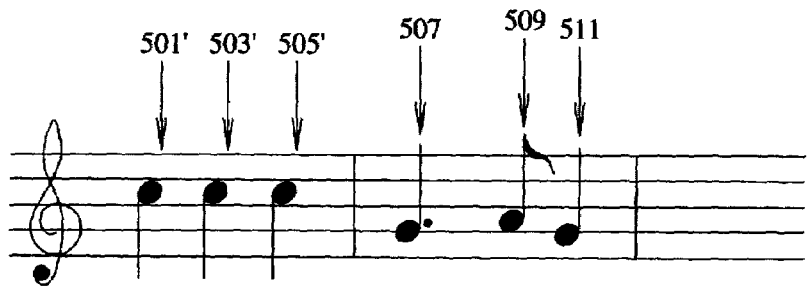

For example, at the time when the processing section 405 decides that change processing terminated, the display on the display screen becomes the display content shown in FIG. 15 (B) in cases where all the note 1511a to note 1511c shown in FIG. 15 (A) are subjected to the same change as made in the note 1511a. The note 1511a' to note 1511c' corresponding to the changed note 1511a to note 1511c are indicated on the staff notation having a G clef as displayed o the display screen as shown in FIG. 15(B).

At this time, with reference to FIG. 5 (B), the note data corresponding to the first sound 501 to third sound 503 of the singing data 617 stored in the third memory 403 are changed at this time. That is, with reference to FIG. 15 (C), the singing melody based on the singing data 617 becomes the melody that is changed such that the first sound 501 to third sound 503 shown in FIG. 5 (A) are changed to first sound 501' to third sound 503'. The processing section 405 reads the changed singing data 617 from the third memory 403 and outputs it to the internal bus 133 via the third transceiver 401.

(S45) The basic processing section 201 of the controller 113 receives the changed singing data 617. The basic processing section 201 stores the received singing data 617 in the storage section 111 via the internal bus 133. Thereafter, the controller 113 terminates the change of the karaoke piece data.

According to the first embodiment, the display of respective data on the display reproducing section 409 as described with reference to FIG. 15 (A) and FIG. 15 (B) is merely an example, and it is not limited thereto. As described with reference to FIG. 11, the multiple note data and multiple rest data may be displayed together with multiple text data.

(3-2-2) Change of Text Data

The processing for changing the text data of the karaoke piece data is described next with reference to FIG. 14.

(S38) The processing section 405 reads the multiple text data of the singing data 617 from the third memory 403 by a given unit. The display reproducing section 409 receives the multiple text data which are read by the processing section 405 by a given unit and displays the received multiple text data. At this time, a given unit of multiple text data read by the processing section 405 from the third memory 403 may be all the text data contained in the singing data 617.

Figure 16:
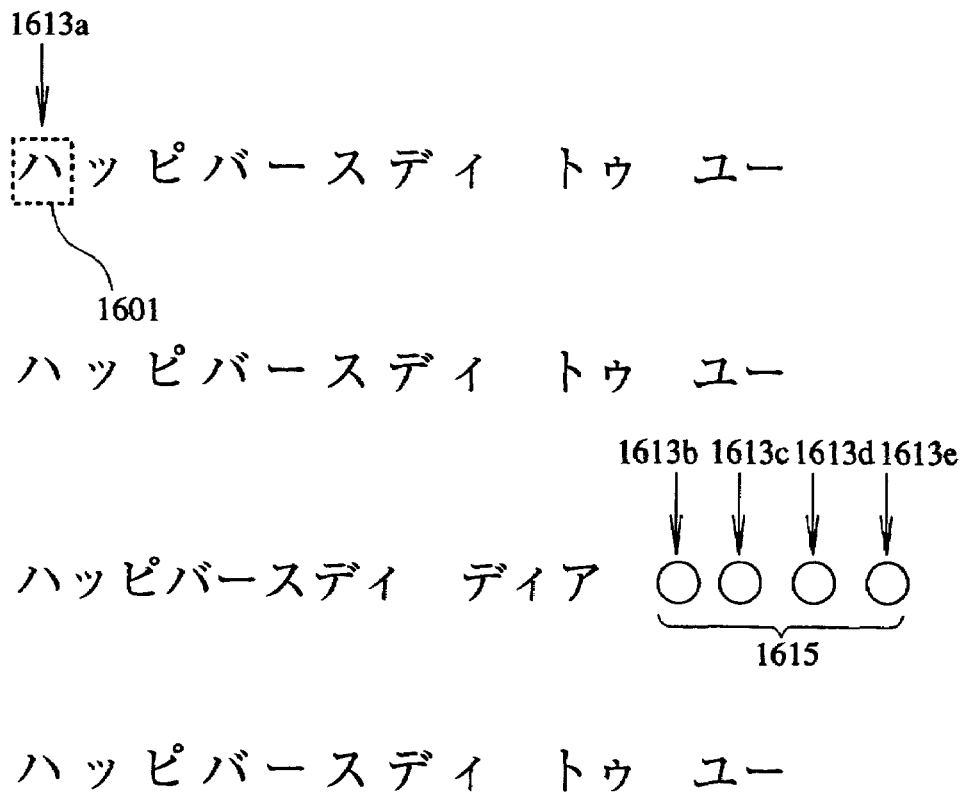
FIG. 16 is a view showing an example of the display screen of the display reproducing section when text data is changed according to the first embodiment of the invention.

An example of multiple text data displayed on the display screen of the display reproducing section 409 is illustrated in FIG. 16. FIG. 16 shows only the display content of the display screen of the display reproducing section 409. An example of the display of only the multiple text data is illustrated in FIG. 16 (an example of display of multiple text data shown in FIG. 16 is "ハッピイバースデイ" (happy birthday) (a part of lyrics by: Robert. H. Coleman, American). According to the first embodiment, the display of multiple note data and multiple rest data as well as multiple text data may be displayed in the same manner as the display screen 100 when reproducing the karaoke piece as described with reference to FIG. 11.

In the display 131, the processing section 405 reads the display data of the singing data 617 from the third memory 403. The text data as well as display data are given to the respective multiple note data and multiple rest data of the singing data 617 as already described with reference to FIG. 5(B). That is, the display data is given to the respective multiple text data.

The processing section 405 reads the display data which is given to the text data corresponding to the first sound of the singing melody of the singing part of the karaoke piece. The processing section 405 outputs the read display data to the display reproducing section 409 and the display reproducing section 409 displays the display data on the display screen.

For example, when the display reproducing section 409 executes the display of the multiple text data shown in FIG. 16 in accordance with steps as mentioned above, the display 1601 of the display data which is given to the text data 1613*a* corresponding to the displayed first sound is also effected by steps as mentioned above.

(S39) The subsequent processing for changing the counted number is executed in the same steps as those made in Item (3-2-1). Accordingly, the overlapping explanation is omitted.

(S40) The subsequent processing for changing the display is executed in the same step as described in Item (3-2-1). Accordingly, the overlapping explanation is omitted.

(S41) When the operations in steps S39 and S40 are executed in the display 131, the processing section 405 decides whether or not the input of change is executed through the input section 129. If the input of change is executed, the routine executes the processing in step S42, while if not executed, it returns to the operation in step S39. The input of change through the input section 129 means the input representing the change of the text data corresponding to the display data 1601 shown in FIG. 16.

(S42) If the input of change is executed through the input section 129, a signal representing the change of text corresponding to the displayed display data 1601 is transmitted from the input section 129 to the display 131.

In the display 131, the signal representing the change of text is received by the processing section 405 via the third transceiver 401. The processing section 405 rewrites the text data corresponding to the displayed display data 1601 in accordance with the information of the received signal. The rewritten test data is outputted from the processing section 405 to the third memory 403 and the display reproducing section 409.

The text data stored in the third memory 403 is changed to the rewritten text data when the rewritten text data is inputted thereto. The display reproducing section 409 displays the rewritten text data received from the processing section 405 on the display screen.

(S43) In the display 131, the processing section 405 decides where or not to terminate the foregoing change processing. If the processing section 405 decides to terminate the change processing, the routine goes to step S44 while if it decides not to terminate the change processing, the routine returns to step S39.

The processing section 405 decides that the change processing is terminated when the input representing the change of the text and the input representing the change of the counted number are terminated.

(S44) The processing section 405 fetches the singing data 617 including the changed multiple text data stored in the third memory 403 upon completion of the changed processing. The fetched singing data 617 is outputted to the internal bus 133 via the third transceiver 401. Thereafter, the processing for changing the text data in the display 131 is entirely terminated.

For example, when the change is executed with respect to the change portion 1615 including the texts 1613*b* to 1613*e* of the displayed text data shown in FIG. 16, the display 1601 of the display data corresponding to the respective texts 1613*b* to 1613*e* is effected. The processing for changing the display 1601 of the display data and the text data corresponding to the displayed display data 1601 is executed by the processing section 405 in accordance with step S42 as described above. The processing section 405 outputs the text data corresponding respectively to the changed texts 1613*b* to 1613*e* to the third memory 403 and the display reproducing section 409.

In the display reproducing section 409, the changed texts 1613*b* to 1613*e* are displayed on the change portion 1615. The respective text data corresponding to the texts 1613*b* to 1613*e* of the multiple text data contained in the singing data 617 stored in the third memory 403 are changed in accordance with step in step S42 in the same manner as the change of the note or rest data as described above. In the step as described above, the processing section 405 reads the changed singing data 617 from the third memory 403 and outputs the read changed singing data 617 to the internal bus 133 via the third transceiver 401.

(S45) The same step as explained with reference to Item (3-2-1) is executed.

2. Portable Telephone System

Described next is a portable telephone system for effecting communication using a portable telephone unit 101 according to a second embodiment of the invention.

(1) Configuration of Portable Telephone System

Figure 17A:
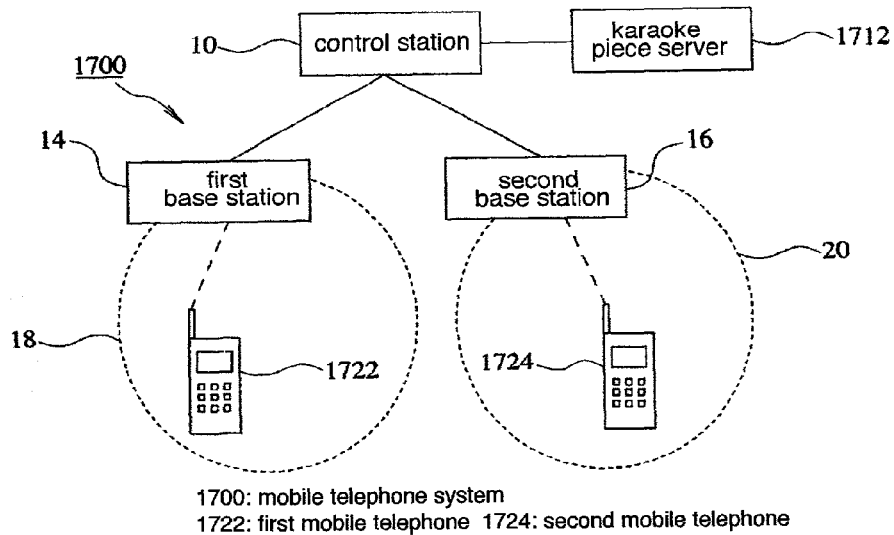
FIG. 17 (A) is a view explaining an example of configuration of a mobile telephone system according to a second embodiment of the invention, and FIG. 17 (B) is a view explaining data transaction of karaoke piece according to the second embodiment of the invention.

A configuration of a portable telephone system 1700 is described with reference to FIG. 17(A). FIG. 17(A) is a view showing the configuration of the portable telephone system 1700 according to the second embodiment of the invention. The configuration of the portable telephone system 1700 is substantially the same as the communication system as explained with reference to FIG. 19(A). Accordingly, the same components are depicted by the same reference numerals as those in FIG. 19(A) and the overlapping explanation is omitted.

According to the second embodiment, a karaoke piece server 1712 is provided in a control station 10 instead of the piece server 12 shown in 19(A). First and second mobile telephones 1722, 1724 are respectively structured by the portable telephone unit 101 which was explained with reference to FIG. 1.

(2) Operation of Portable Telephone System

The operation of the portable telephone system 1700 according to the second embodiment is described. The basic operation of the portable telephone system 1700 is the same as the operation of the communication system shown in FIG. 19(A). Communication is effected between the first mobile telephone 1722 and the second mobile telephone 1724 by the same step as explained with reference to FIG. 19(A). The overlapping explanation of the communication to be effected between the first mobile telephone 1722 and the second mobile telephone 1724 is omitted.

(2-1) Transmission and Reception of Karaoke Piece Data

Figure 19B:
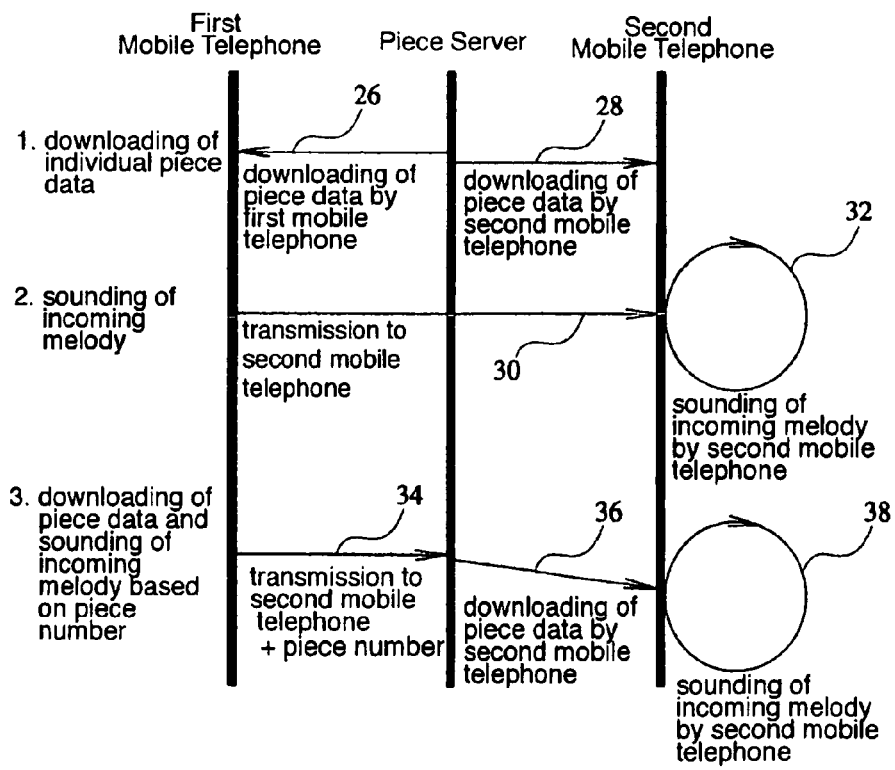

Described with reference to FIG. 17 (B) is a case where an operation, which is the same as the transaction of an incoming melody as explained with reference to FIG. 19(B), is effected in the portable telephone system 1700.

Step 1726 and step 1728 shown in the first row of FIG. 17 (B) are the same as the first row shown in FIG. 19 (B) which explained the data transaction. In step 1726, a user A downloads a favorite karaoke piece data from the karaoke piece server 1712 using the first mobile telephone 1722.

At this time, in the first mobile telephone 1722, the user A inputs the karaoke piece number. Thereafter, the first mobile telephone 1722 transmits the input karaoke piece number to a first base station 14. More in detail, with reference to FIG. 1, in the portable telephone unit 101 constituting the first mobile telephone 1722, the karaoke piece number inputted through the input section 129 is received by the basic processing section 201 of the controller 113 via the internal bus 133. Subsequently, the basic processing section 201 transmits the received karaoke piece number to the communication section 105 via the internal bus 133. The communication section 105 transmits the karaoke piece number to the first base station 14 via the antenna 103.

Subsequently, the control station 10 receives the karaoke piece number via the first base station 14. In the control station 10, the karaoke piece server 1712 retrieves karaoke piece data base provided therein, not shown in FIG. 17 (A), to detect the karaoke piece data 601 corresponding to the karaoke piece number. The detected karaoke piece data 601 is downloaded by the first mobile telephone 1722 via the first base station 14. The download is executed in the following steps.

Referring to the configuration of the portable telephone unit 101 shown in FIG. 1, the karaoke piece data 601 is received by the communication section 105 via the antenna 103 in the first mobile telephone 1722. Subsequently, the communication section 105 stores the karaoke piece data 601 in a RAM 123 or ROM 125 of a storage section 111 via the internal bus 133.

Step 1728 to download the karaoke piece data by the second mobile telephone 1724 in the first row of FIG. 17 (B) is the same as step 1726 to download by the first mobile telephone 1722. Accordingly, the overlapping explanation is omitted.

Step 1730 and step 1732 shown in the second row of FIG. 17 (B) are the same as the second row shown in FIG. 19 (B) which explained data transaction. Accordingly, the overlapping explanation thereof is omitted. In step 1732, the second mobile telephone 1724 sounds karaoke piece when receiving an incoming call.

This is described with reference to FIG. 1, the calling from the first mobile telephone 1722 which is notified from the second base station 16 is received by the communication section 105 in the second mobile telephone 1724 via the antenna 103. Subsequently, the communication section 105 notifies the controller 113 the reception of the calling from the second base station 16 via the internal bus 133. This notification is received by the basic processing section 201 of the controller 113. Thereafter, the basic processing section 201 reads the karaoke piece data 601 which is stored in the storage section 111 in advance. In the portable telephone unit 101, the reproduction processing of the karaoke piece is executed in steps as explained with reference to FIG. 8, FIG. 9, and FIG. 10, thereby sounding the karaoke piece.

Figure 17B:
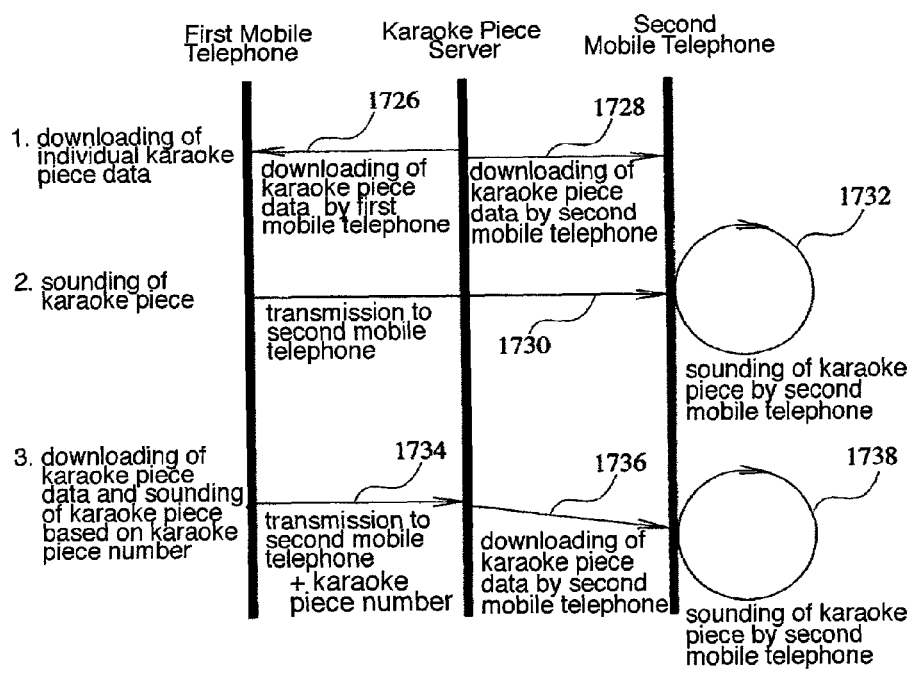

Meanwhile, steps 1734, 1736 and 1738 shown in the third row of FIG. 17(B) are the same as those shown in the third row of FIG. 19(B) which explained data transaction. In step 1734 in the third row of FIG. 19(B), the first mobile telephone 1722 transmits the telephone number of the second mobile telephone 1724 together with the karaoke piece number when it calls out the second mobile telephone 1724. Then, the control station 10 receives the telephone number and the karaoke piece number via the first base station 14.

In step 1736, the karaoke piece server 1712 retrieves and detects the karaoke piece data 601 corresponding to the received karaoke piece number in accordance with steps described in the first row of FIG. 17(B). Further, the control station 10 detects the second mobile telephone 1724 corresponding to the received telephone number in accordance with steps described with reference to FIG. 19(B) and transmits the retrieved karaoke piece data 601 to the second mobile telephone 1724 via the second base station 16.

The second mobile telephone 1724 executes the same processing in step 1738 as executed in the second row in FIG. 17(B). At this time, the karaoke piece data 601 which has been received by the second mobile telephone 1724 is stored in the storage section 111 from the communication section 105 via the internal bus 133. It is preferable that the karaoke piece data 601 is stored in the RAM 123 of the storage section 111.

The karaoke piece based on the received karaoke piece data 601 is sounded from the second mobile telephone 1724 in the same steps as those executed in the second row of FIG. 17(B). The user B can recognize that the first mobile telephone 1722 of the user A calls out while listening this karaoke piece. If there exists the karaoke piece data 601 in the second mobile telephone 1724 corresponding to the karaoke number specified by the user A, the karaoke piece based on the karaoke piece data 601 is sounded from the second mobile telephone 1724.

In the third row of FIG. 17(B), it is possible to design that only the singing melody of the singing part of the karaoke piece can be sounded from the second mobile telephone 1724 of the user B by the input of the user A when the first mobile telephone 1722 calls out. In this case, the first mobile telephone 1722 transmits the notification representing the sounding of only the singing melody of the singing part of the karaoke piece together with the karaoke piece number. In the same steps as those described above, the notification representing the sounding of only the singing melody of the singing part is received in the second mobile telephone 1724. This notification is received by the communication section 105 in the second mobile telephone 1724 via the antenna 103, then it is received by the basic processing section 201 of the controller 113 via the internal bus 133. As a result, in the second mobile telephone 1724, the processing of information relating only to the singing voice synthesis contained in the karaoke piece data 601 is executed in steps as described with reference to FIG. 8, FIG. 9, and FIG. 10.

Further, it is possible to allow the second mobile telephone 1724 of the user B to sound only the melodies of multiple melody parts of the karaoke piece when the first mobile telephone 1722 calls out in the same steps as those mentioned above.

Still further, it is possible to allow the first and second mobile telephones 1722 and 1724 to sound only the melodies of multiple melody parts or singing melodies of the singing parts of the karaoke piece for the downloaded karaoke piece data 601 in the data transaction shown in FIG. 17(B). At this time, the user A having the first mobile telephone 1722 and the user B having the second mobile telephone 1724 select that either the melodies of the melody parts or singing melodies of the singing parts are sounded by inputting through the input section 129. By this selection, the processing is executed in the first and second mobiles 1722 and 1724 in accordance with steps as mentioned above.

(2-2) The Transmission and Reception of the Changed Karaoke Piece Data

The portable telephone unit 101 constituting the first and second mobiles 1722 and 1724 shown in FIG. 17(A) can change the karaoke piece data 601 in steps as described in the first row. In the portable telephone system 1700 according to the second embodiment, the user A changes the karaoke piece data 601 using the first mobile telephone 1722, and transmits the changed karaoke piece data 601 to the second mobile telephone 1724, thereby expressing user's will to the user B having the second mobile telephone 1724. That is, the transmission of the changed karaoke piece data 601 is generally the same as the preparation, change or transmission of a mail utilizing a mailing function of the mobile telephone so as to express one user's will to the other user.

Data transaction of the changed karaoke piece data 601 is described with reference to FIG. 18. In the data transaction shown in FIG. 18, the user A transmits the karaoke piece data 601 changed in the first mobile telephone 1722 to the second mobile telephone 1724 of the user B in the portable telephone system 1700 shown in FIG. 17(A).

Figure 18:
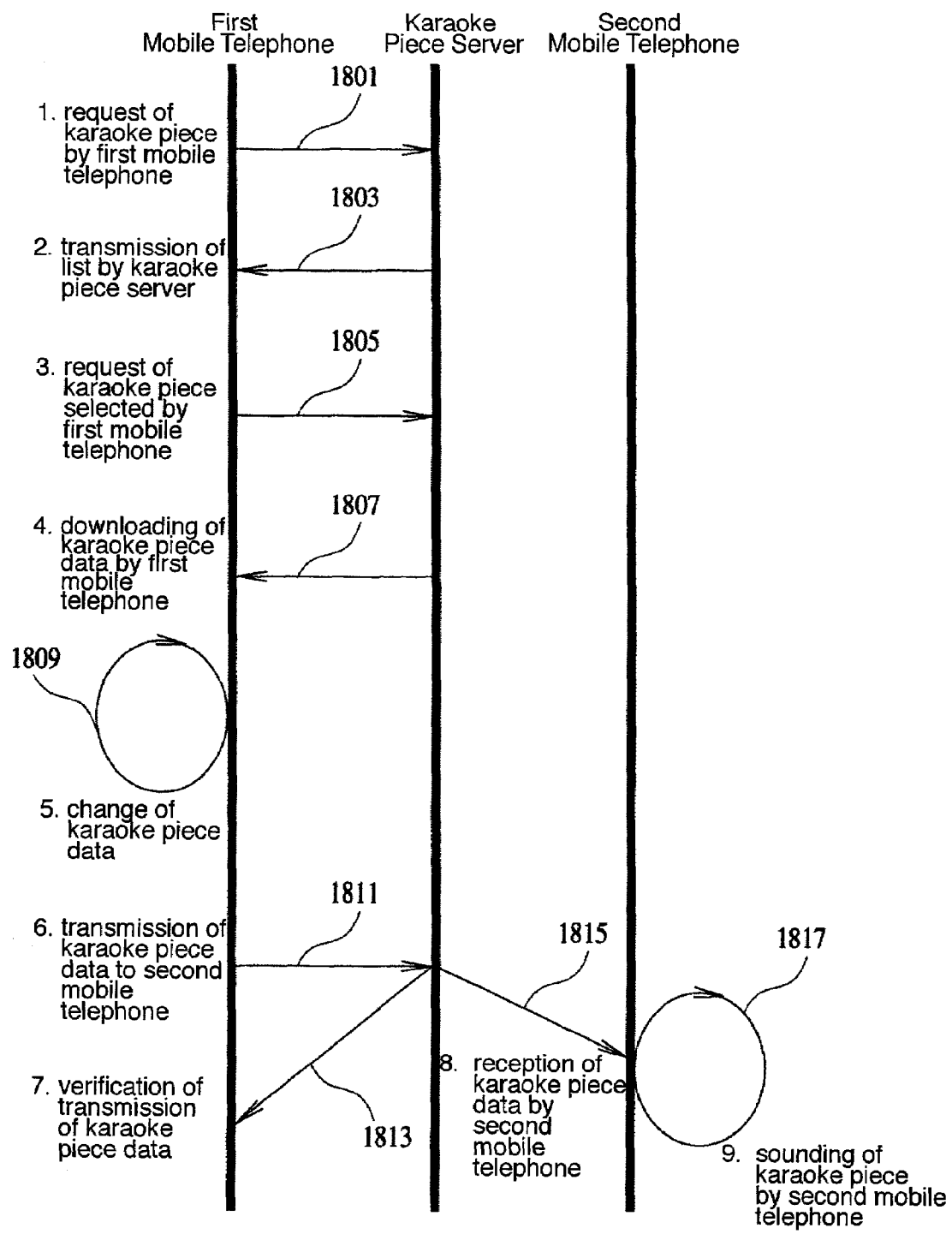
FIG. 18 is a view explaining data transaction of changed karaoke piece data according to the second embodiment of the invention.

In step 1801 shown in the first row of FIG. 18, the user A requests the control station 10 a karaoke piece using the first mobile telephone 1722. It is preferable that this request is executed by the user A when inputting it through the input section 129 in the first mobile telephone 1722. The request which is inputted by the user A in the first mobile telephone 1722 is received by the basic processing section 201 of the controller 113 via the input section 129 and the internal bus 133. Subsequently, the basic processing section 201 transmits the request of the karaoke piece to the communication section 105 via the internal bus 133. The communication section 105 transmits the request of the karaoke piece to the first base station 14. It is optimum that the request of the karaoke piece accompanies a first character of the title and specification of items of karaoke piece.

Next in step 1803 shown in the second row of FIG. 18, the control station 10 receives the request of the karaoke piece from the first base station 14 which was transmitted from the first mobile telephone 1722. Subsequently, the karaoke piece server 1712 fetches a selection piece list in the control station 10. The selection piece list transmitted from the control station 10 is received by the first mobile telephone 1722 via the first base station 14.

The selection piece list as mentioned above is a list for the user A having the first mobile telephone 1722 to select a favorite karaoke piece. The selection piece list is limited to the total number of karaoke pieces which are stored in the karaoke piece data base of the karaoke piece server 1712. If the request of the karaoke piece list is a request accompanied by a first letter of the title of the karaoke piece or the specification of items of the karaoke piece as mentioned above, the selection piece list in accordance with the request information is transmitted from the control station 10. Further, it is preferable that the selection piece list comprises karaoke piece numbers of multiple karaoke pieces.

Subsequently, in step 1805 shown in the third row of FIG. 18, the user A selects a favorite karaoke piece from the received selection piece list using the first mobile telephone 1722. The user A transmits the karaoke piece number relating to the selected karaoke piece from the first mobile telephone 1722 to the control station 10.

More in detail, the selection piece list transmitted from the control station 10 is received by the communication section 105 in the first mobile telephone 1722 via the antenna 103. Subsequently, the communication section 105 transmits the received selection piece list to the basic processing section 201 of the controller 113 via the internal bus 133. The basic processing section 201 transmits the received selection piece list to the display 131 via the internal bus 133.

Referring to FIG. 4, the processing section 405 receives the selection piece list in the display 131 via the internal bus 133. The display of the selection piece list received by the processing section 405 is effected in the display reproducing section 409.

The user A selects the favorite karaoke piece by inputting it through the input section 129 while watching the selection piece list displayed on the display screen of the display reproducing section 409. A signal representing the transmission of the specification of the karaoke piece from the selection piece list is transmitted from the input section 129 when the user A inputs it. This signal is received by the processing section 405 of the display 131 via the internal bus 133. Subsequently, the processing section 405 transmits the karaoke piece number of the karaoke piece specified by the received signal from the selection piece list to the internal bus 133 via the third transceiver 401.

The basic processing section 201 of the controller 113 receives the karaoke piece number transmitted from the display 131. The basic processing section 201 transmits the received karaoke piece number to the communication section 105 via the internal bus 133. Subsequently, the communication section 105 transmits the received karaoke piece number to the first base station 14 via the antenna 103.

In step 1807 to be executed subsequently as shown in the fourth row of FIG. 18, the first mobile telephone 1722 downloads the karaoke piece data 601 corresponding to the karaoke piece number transmitted in step 1805 as shown in the third row of FIG. 18 from the karaoke piece server 1712 of the control station 10. Step 1807 is the same as step 1726 shown in the first row of FIG. 17(B) which explained in the data transaction. Accordingly, the overlapping explanation is omitted.

In step 1809 shown in the fifth row of FIG. 18, the user A changes the downloaded karaoke piece data 601 using the first mobile telephone 1722. The processing for changing the karaoke piece data 601 in the first mobile telephone 1722 is executed in the same step as step in the first row which was described with reference to FIG. 14. It is preferable that the changed karaoke piece data 601 is stored in the RAM 123 of the storage section 111.

Thereafter, in step 1811 shown in the sixth row of FIG. 18, the user A transmits the changed karaoke piece data 601 to the second mobile telephone 1724 of the user B using the first mobile telephone 1722. At this time, the telephone number of the second mobile telephone 1724 together with the changed karaoke piece data 601 are transmitted from the first mobile telephone 1722 to the first base station 14.

The telephone number of the second mobile telephone 1724 is inputted by the user A through the input section 129. The inputted telephone number of the second mobile telephone 1724 is received by the basic processing section 201 of the controller 113 via the input section 129 and the internal bus 133. The basic processing section 201 reads the changed karaoke piece data 601 from the RAM 123 of the controller 113. The basic processing section 201 transmits the changed karaoke piece data 601 together with the telephone number of the second mobile telephone 1724 to the communication section 105 via the internal bus 133. The communication section 105 transmits the telephone number of the second mobile telephone 1724 and the changed karaoke piece data 601 to the first base station 14 via the antenna 103.

In step 1813 shown in the seventh row of FIG. 18, the telephone number of the second mobile telephone 1724 and the changed karaoke piece data 601 respectively transmitted from the first mobile telephone 1722 are received by the control station 10 via the first base station 14. Subsequently, the retrieval of the second mobile telephone 1724 is executed in the control station 10 using the received telephone number of the second mobile telephone 1724 in the same step as that described with reference to FIG. 19(A). Then, the control station 10 transmits the changed karaoke piece data 601 to the second mobile telephone 1724. After the transmission of the karaoke piece data 601, the control station 10 transmits the notification representing the verification of the transmission of the changed karaoke piece data 601 to the first mobile telephone 1722.

The first mobile telephone 1722 receives the notification representing the verification of the transmission of the changed karaoke piece data 601 via the first base station 14. That is, the user A can verify the transmission of the changed karaoke piece data 601 from the control station 10 by this notification.

In data transaction 1815 shown in the eighth row of FIG. 18, the karaoke piece data 601 transmitted from the control station 10 is received by the second mobile telephone 1724 via the second base station 16.

Finally, in step 1817 shown in the ninth row of FIG. 18, the karaoke piece is sounded in the second mobile telephone 1724 based on the received karaoke piece data 601. It is preferable that the karaoke piece is sounded in the following steps.

The communication section 105 receives the changed karaoke piece data 601 in the second mobile telephone 1724 via the antenna 103. The received karaoke piece data 601 is stored in the RAM 123 of the storage section 111 from the communication section 105. Subsequently, the karaoke piece is sounded in the second mobile telephone 1724 based on the changed karaoke piece data 601 in accordance with steps as described with reference to FIG. 8, FIG. 9 and FIG. 10. The user B having the second mobile telephone 1724 can verify the will of the user A by listening the sounded karaoke piece.

As described above, according to the portable telephone unit of the invention, since the respective melody signals produced in and outputted from the sound generator and the respective synthetic singing voice signals produced in and outputted from the singing voice synthesizing section are inputted respectively to the audio reproducing section at the same time when the karaoke piece data is subjected to the reproduction processing, the melodies and synthetic singing voices as the karaoke piece can be sounded at the same time. The singing voice synthesizing section decides the rhythm control and synthesis unit of the respective synthetic singing voice signals by analyzing singing voice synthesis information, thereby preparing singing voice waveforms. Accordingly, the synthetic singing voices to be sounded by the audio reproducing section are voices like a natural human singing.

Further, the portable telephone unit of the invention can sound the singing voices and the melodies at the same time when the karaoke piece data is subjected to the reproduction processing, and the conventional karaoke function is realized by the display. As a result, the portable telephone unit of the invention has an efficient karaoke function which is different from the conventional function to support the user.

Still further, according to the portable telephone unit of the invention, the change of the karaoke piece data can be executed by changing multiple note data or multiple text data of the singing data.

More still further, according to the portable telephone system of the invention, a user having a portable telephone unit at the transmittance side can express his or here will by transmitting the karaoke piece data, which was changed in the portable telephone unit, to the other portable telephone unit.

What is claimed is:

1. A mobile telephone unit using singing voice synthesis comprising:
   a storage section for storing karaoke piece data;
   a controller for reading the karaoke piece data from the storage section, analyzing the karaoke piece data, and fetching melody information and singing voice synthesis information based on the karaoke piece data;
   a sound generator for analyzing the melody information received from the controller and producing multiple melody signals;

a singing voice synthesizing section for analyzing the singing voice synthesis information received from the controller and producing multiple synthetic singing voice signals; and an audio reproducing section for receiving the multiple melody signals outputted from the sound generator and the multiple synthetic singing voice signals outputted from the singing voice synthesizing section in synchronization with timings when the multiple melody signals are outputted, thereby sounding a karaoke piece;

wherein the controller fetches melody data from part data using a melody part assignment data of a part assignment data when analyzing the karaoke piece data having tempo data, the part assignment and the part data; and wherein the controller includes a data analyzing section for fetching singing data from the part data using the singing part assignment data of the part assignment data, thereby changing the melody information to information containing the tempo data, the melody part assignment data and the melody data, and changing the singing voice synthesis information to information containing the tempo data and the singing data;

wherein the melody data comprises multiple melody part data, said multiple melody part data comprise corresponding tones, multiple note data and multiple rest data;

said singing data comprises text data which are given to the multiple rest data and the multiple note data with one-to-one relation as a rule, and display data which are given to the multiple rest data and the multiple note data with one-to-one relation, further comprising:

a memory for storing information relating to the singing voice synthesis received from the controller;

a processing section for reading the tempo data and the singing data of the singing voice synthesis information from the memory at the same time when the multiple melody signals are outputted form the sound generator or the multiple synthetic singing voice signals are outputted from the singing voice synthesizing section;

display data for receiving and displaying a given unit of multiple rest data and multiple note data, and the text data respectively corresponding to a given unit of multiple rest data and multiple note data, said display data being outputted from said processing section with reference to the tempo data;

a display reproducing section for receiving and displaying the display data displaying the note data and the text data corresponding to the multiple synthetic singing voice signals outputted in synchronization with the timing when the synthetic singing voice signals are outputted from the singing voice synthesizing section; and a display data output counter for counting the number of outputs of the display data;

wherein the controller reads the karaoke piece data from the storage section upon reception of instruction representing change of the multiple note data or multiple text data of the singing data which has been inputted through the input section, said controller fetches the singing data from the karaoke piece data when it is analyzed by the data analyzing section, and transmits the singing data together with the instruction representing change of data to the display;

said display reproducing section receives the text data corresponding to a given unit of the multiple rest data, multiple note data of the singing data or the text data corresponding to the multiple rest data and the multiple note data which are read from the processing section and stored in the memory and received from the controller, and displays them on the display;

said display data output counter section changes the counted number when the data is inputted through the input section; and said processing section specifies the note data to be changed or text data to be changed of the displayed multiple note data or multiple text data based on the changed counted number which is outputted from the display data output counter;

wherein the change of the specified note data to be changed or the text data to be changed is effected by inputting through the input section; and comprising:

a first base station having a first radio zone for receiving a karaoke piece number from the first mobile telephone when directly effecting a radio communication with the first mobile telephone belonging to the first radio zone;

a control station having a karaoke piece server for transmitting karaoke piece data corresponding to the karaoke piece number received from the first base station and for detecting the karaoke piece data by retrieving a karaoke piece data base located therein;

the control station changing the karaoke piece data received from the first data station by changing the multiple note data or multiple text data of the singing data of the karaoke piece data, receiving the changed karaoke piece data transmitted by the first mobile telephone, and a telephone number of the second mobile telephone via the first base station and retrieving the second mobile telephone corresponding to the telephone number thereof; and a second base station having a second radio zone for transmitting the changed karaoke piece data which is received from the control station to the second mobile telephone when directly effecting a radio communication with the second mobile station belonging to the second radio zone.

2. The mobile telephone system according to claim 1, wherein the control station transmits the changed karaoke piece data, then transmits a notification of verification of the transmission to the first mobile telephone.

3. A mobile telephone unit using singing voice synthesis comprising:

a storage section for storing karaoke piece data;

a controller for reading the karaoke piece data from the storage section, analyzing the karaoke piece data, and fetching melody information and singing voice synthesis information based on the karaoke piece data;

a sound generator for analyzing the melody information received from the controller and producing multiple melody signals;

a singing voice synthesizing section for analyzing the singing voice synthesis information received from the controller and producing multiple synthetic singing voice signals; and an audio reproducing section for receiving the multiple melody signals outputted from the sound generator and the multiple synthetic singing voice signals outputted from the singing voice synthesizing section in synchronization with timings when the multiple melody signals are outputted, thereby sounding a karaoke piece;

wherein the controller fetches melody data from part data using a melody part assignment data of a part assignment data when analyzing the karaoke piece data having tempo data, the part assignment and the part data; and wherein the controller includes a data analyzing section for fetching singing data from the part data using the singing part assignment data of the part assignment data, thereby changing the melody information to information containing the tempo data, the melody part assignment data and the melody data, and changing the singing voice synthesis information to information containing the tempo data and the singing data;

wherein the melody data comprises multiple melody part data, said multiple melody part data comprise corresponding tones, multiple note data and multiple rest data;

said singing data comprises text data which are given to the multiple rest data and the multiple note data with one-to-one relation as a rule, and display data which are given to the multiple rest data and the multiple note data with one-to-one relation;

wherein the singing voice synthesizing section comprises:

a Japanese analyzing section for analyzing Japanese of the multiple text data of the singing voice data using a wordbook when analyzing singing voice synthesis information and deciding multiple pauses, multiple basic accents of the multiple text data using the note data and the rest data corresponding to the respective multiple text data when analyzing Japanese;

a parameter producing section for deciding a rhythm control pattern of the multiple text data, which are analyzed in Japanese, relating to a frequency and continuation time using a rhythm control data based on multiple pauses, multiple basic accents, the tempo data, the multiple rest data and the multiple note data, said parameter producing section further deciding singing voice synthesis units of the multiple text data which are decided in the rhythm control pattern;

a voice synthesizing section for fetching singing voice elements corresponding to the respective singing voice synthesis units from a singing voice element book, thereby preparing the multiple synthetic singing voice signals;

further comprising:

a memory for storing information relating to the singing voice synthesis received from the controller;

a processing section for reading the tempo data and the singing data of the singing voice synthesis information from the memory at the same time when the multiple melody signals are outputted form the sound generator or the multiple synthetic singing voice signals are outputted from the singing voice synthesizing section;

display data for receiving and displaying a given unit of multiple rest data and multiple note data, and the text data respectively corresponding to a given unit of multiple rest data and multiple note data, said display data being outputted from said processing section with reference to the tempo data;

a display reproducing section for receiving and displaying the display data displaying the note data and the text data corresponding to the multiple synthetic singing voice signals outputted in synchronization with the timing when the synthetic singing voice signals are outputted from the singing voice synthesizing section; and a display data output counter for counting the number of outputs of the display data;

wherein the controller reads the karaoke piece data from the storage section upon reception of instruction representing change of the multiple note data or multiple text data of the singing data which has been inputted through the input section, said controller fetches the singing data from the karaoke piece data when it is analyzed by the data analyzing section, and transmits the singing data together with the instruction representing change of data to the display;

said display reproducing section receives the text data corresponding to a given unit of the multiple rest data, multiple note data of the singing data or the text data corresponding to the multiple rest data and the multiple note data which are read from the processing section and stored in the memory and received from the controller, and displays them on the display;

said display data output counter section changes the counted number when the data is inputted through the input section; and said processing section specifies the note data to be changed or text data to be changed of the displayed multiple note data or multiple text data based on the changed counted number which is outputted from the display data output counter;

wherein the change of the specified note data to be changed or the text data to be changed is effected by inputting through the input section; and comprising a first base station having a first radio zone for receiving a karaoke piece number from the first mobile telephone when directly effecting a radio communication with the first mobile telephone belonging to the first radio zone;

a control station having a karaoke piece server for transmitting karaoke piece data corresponding to the karaoke piece number received from the first base station and for detecting the karaoke piece data by retrieving a karaoke piece data base located therein;

the control station changing the karaoke piece data received from the first data station by changing the multiple note data or multiple text data of the singing data of the karaoke piece data, receiving the changed karaoke piece data transmitted by the first mobile telephone, and a telephone number of the second mobile telephone via the first base station and retrieving the second mobile telephone corresponding to the telephone number thereof; and a second base station having a second radio zone for transmitting the changed karaoke piece data which is received from the control station to the second mobile telephone when directly effecting a radio communication with the second mobile station belonging to the second radio zone.

4. The mobile telephone system according to claim 3, wherein the control station transmits the changed karaoke piece data, then transmits a notification representing verification of the transmission to the first mobile telephone.

5. A mobile telephone unit using sinning voice synthesis comprising:

a storage section for storing karaoke piece data;

a controller for reading the karaoke piece data from the storage section, analyzing the karaoke piece data, and fetching melody information and singing voice synthesis information based on the karaoke piece data;

a sound generator for analyzing the melody information received from the controller and producing multiple melody signals;

a singing voice synthesizing section for analyzing the singing voice synthesis information received from the controller and producing multiple synthetic singing voice signals; and an audio reproducing section for receiving the multiple melody signals outputted from the sound generator and the multiple synthetic singing voice signals outputted from the singing voice synthesizing section in synchronization with timings when the multiple melody signals are outputted, thereby sounding a karaoke piece;

wherein the controller fetches melody data from part data using a melody part assignment data of a part assignment data when analyzing the karaoke piece data having tempo data, the part assignment and the part data; and wherein the controller includes a data analyzing section for fetching singing data from the part data using the singing part assignment data of the part assignment data, thereby changing the melody information to information containing the tempo data, the melody part assignment data and the melody data, and changing the singing voice synthesis information to information containing the tempo data and the singing data;

wherein the melody data comprises multiple melody part data, said multiple melody part data comprise corresponding tones, multiple note data and multiple rest data;

said singing data comprises text data which are given to the multiple rest data and the multiple note data with one-to-one relation as a rule, and display data which are given to the multiple rest data and the multiple note data with one-to-one relation;

wherein the sound generator includes a melody analyzing section for fetching the multiple melody part data from the melody data using the melody part assignment data, deciding tone parameters of the multiple melody signals using respective tones of the melody part data, and deciding sound generator parameters of the multiple melody signals based on the tempo data, the multiple note data and the multiple rest data of the melody part data respectively when analyzing the melody information;

further comprising:

a memory for storing information relating to the singing voice synthesis received from the controller;

a processing section for reading the tempo data and the singing data of the singing voice synthesis information from the memory at the same time when the multiple melody signals are outputted form the sound generator or the multiple synthetic singing voice signals are outputted from the singing voice synthesizing section;

display data for receiving and displaying a given unit of multiple rest data and multiple note data, and the text data respectively corresponding to a given unit of multiple rest data and multiple note data, said display data being outputted from said procession section with reference to the tempo data;

a display reproducing section for receiving and displaying the display data displaying the note data and the text data corresponding to the multiple synthetic singing voice signals outputted in synchronization with the timing when the synthetic singing voice signals are outputted from the signing voice synthesizing section; and a display data output counter for counting the number of outputs of the display data;

wherein the controller reads the karaoke piece data from the storage section upon reception of instruction representing change of the multiple note data or multiple text data of the singing data which has been inputted through the input section, said controller fetches the singing data from the karaoke piece data when it is analyzed by the data analyzing section, and transmits the singing data together with the instruction representing change of data to the display;

said display reproducing section receives the text data corresponding to a given unit of the multiple rest data, multiple note data of the singing data or the text data corresponding to the multiple rest data and the multiple note data which are read from the processing section and stored in the memory and received from the controller, and displays them on the display;

said display data output counter section changes the counted number when the data is inputted through the input section; and said processing section specifies the note data to be changed or text data to be changed of the displayed multiple note data or multiple text data based on the changed counted number which is outputted from the display data output counter;

wherein the change of the specified note data to be changed or the text data to be changed is effected by inputting through the input section; and comprising a first base station having a first radio zone for receiving a karaoke piece number from the first mobile telephone when directly effecting a radio communication with the first mobile telephone belonging to the first radio zone;

a control station having a karaoke piece server for transmitting karaoke piece data corresponding to the karaoke piece number received from the first base station and for detecting the karaoke piece data by retrieving a karaoke piece data base located therein;

the control station changing the karaoke piece data received from the first data station by changing the multiple note data or multiple text data of the singing data of the karaoke piece data, receiving the changed karaoke piece data transmitted by the first mobile telephone, and a telephone number of the second mobile telephone via the first base station and retrieving the second mobile telephone corresponding to the telephone number thereof; and a second base station having a second radio zone for transmitting the changed karaoke piece data which is received from the control station to the second mobile telephone when directly effecting a radio communication with the second mobile station belonging to the second radio zone.

6. The mobile telephone system according to claim 5, wherein the control station transmits the changed karaoke piece data, then transmits a notification representing verification of the transmission to the first mobile telephone.

7. A mobile telephone unit using singing voice synthesis comprising:

a storage section for storing karaoke piece data;

a controller for reading the karaoke piece data from the storage section, analyzing the karaoke piece data, and fetching melody information and singing voice synthesis information based on the karaoke piece data;

a sound generator for analyzing the melody information received from the controller and producing multiple melody signals;

a singing voice synthesizing section for analyzing the singing voice synthesis information received from the controller and producing multiple synthetic singing voice signals; and an audio reproducing section for receiving the multiple melody signals outputted from the sound generator and the multiple synthetic singing voice signals outputted from the singing voice synthesizing section in synchronization with timings when the multiple melody signals are outputted, thereby sounding a karaoke piece;

wherein the controller fetches melody data from part data using a melody part assignment data of a part assignment data when analyzing the karaoke piece data having tempo data, the part assignment and the part data; and wherein the controller includes a data analyzing section for fetching singing data from the part data using the singing part assignment data of the part assignment data, thereby changing the melody information to information containing the tempo data, the melody part assignment data and the melody data, and changing the singing voice synthesis information to information containing the tempo data and the singing data;

wherein the melody data comprises multiple melody Part data, said multiple melody part data comprise corresponding tones, multiple note data and multiple rest data;

said singing data comprises text data which are given to the multiple rest data and the multiple note data with one-to-one relation as a rule, and display data which are given to the multiple rest data and the multiple note data with one-to-one relation;

wherein the singing voice synthesizing section comprises:

a Japanese analyzing section for analyzing Japanese of the multiple text data of the singing voice data using a wordbook when analyzing singing voice synthesis information and deciding multiple pauses, multiple basic accents of the multiple text data using the note data and the rest data corresponding to the respective multiple text data when analyzing Japanese;

a parameter producing section for deciding a rhythm control pattern of the multiple text data, which are analyzed in Japanese, relating to a frequency and continuation time using a rhythm control data based on multiple pauses, multiple basic accents, the tempo data, the multiple rest data and the multiple note data, said parameter producing section further deciding singing voice synthesis units of the multiple text data which are decided in the rhythm control pattern;

a voice synthesizing section for fetching singing voice elements corresponding to the respective singing voice synthesis units from a sinning voice element book, thereby preparing the multiple synthetic singing voice signals;

wherein the sound generator includes a melody analyzing section for fetching the multiple melody part data from the melody data using the melody part assignment data, deciding tone parameters of the multiple melody signals using respective tones of the melody part data, and deciding sound generator parameters of the multiple melody signals based on the tempo data, the multiple note data and the multiple rest data of the melody part data respectively when analyzing the melody information;

further comprising:

a memory for storing information relating to the singing voice synthesis received from the controller;

a processing section for reading the tempo data and the singing data of the singing voice synthesis information from the memory at the same time when the multiple melody signals are outputted form the sound generator or the multiple synthetic singing voice signals are outputted from the singing voice synthesizing section;

display data for receiving and displaying a given unit of multiple rest data and multiple note data, and the text data respectively corresponding to a given unit of multiple rest data and multiple note data, said display data being outputted from said processing section with reference to the tempo data;

a display reproducing section for receiving and displaying the display data displaying the note data and the text data corresponding to the multiple synthetic singing voice signals outputted in synchronization with the timing when the synthetic singing voice signals are outputted from the singing voice synthesizing section; and a display data output counter for counting the number of outputs of the display data;

wherein the controller reads the karaoke piece data from the storage section upon reception of instruction representing change of the multiple note data or multiple text data of the singing data which has been inputted through the input section, said controller fetches the singing data from the karaoke piece data when it is analyzed by the data analyzing section, and transmits the singing data together with the instruction representing change of data to the display;

said display reproducing section receives the text data corresponding to a given unit of the multiple rest data, multiple note data of the singing data or the text data corresponding to the multiple rest data and the multiple note data which are read from the processing section and stored in the memory and received from the controller, and displays them on the display;

said display data output counter section changes the counted number when the data is inputted through the input section; and said processing section specifies the note data to be changed or text data to be changed of the displayed multiple note data or multiple text data based on the changed counted number which is outputted from the display data output counter;

wherein the change of the specified note data to be changed or the text data to be changed is effected by inputting through the input section; and comprising a first base station having a first radio zone for receiving a karaoke piece number from the first mobile telephone when directly effecting a radio communication with the first mobile telephone belonging to the first radio zone;

a control station having a karaoke piece server for transmitting karaoke piece data corresponding to the karaoke piece number received from the first base station and for detecting the karaoke piece data by retrieving a karaoke piece data base located therein;

the control station changing the karaoke piece data received from the first data station by changing the multiple note data or multiple text data of the singing data of the karaoke piece data, receiving the changed karaoke piece data transmitted by the first mobile telephone, and a telephone number of the second mobile telephone via the first base station and retrieving the second mobile telephone corresponding to the telephone number thereof; and a second base station having a second radio zone for transmitting the changed karaoke piece data which is received from the control station to the second mobile telephone when directly effecting a radio communication with the second mobile station belonging to the second radio zone.

8. The mobile telephone system according to claim 7, wherein the control station transmits the changed karaoke piece data, then transmits a notification representing verification of the transmission to the first mobile telephone.

* * * * *